US008713503B2

(12) United States Patent
Ishikawa

(10) Patent No.: US 8,713,503 B2
(45) Date of Patent: Apr. 29, 2014

(54) ASSISTING APPARATUS, METHOD, AND PROGRAM FOR CHECKING CROSSTALK NOISE BETWEEN HIERARCHIZED MODULES IN A SEMICONDUCTOR CIRCUIT

(75) Inventor: Yoichiro Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/291,226

(22) Filed: Nov. 8, 2011

(65) Prior Publication Data

US 2012/0124540 A1 May 17, 2012

(30) Foreign Application Priority Data

Nov. 12, 2010 (JP) .................................. 2010-253347

(51) Int. Cl.
*G06F 17/50* (2006.01)

(52) U.S. Cl.
USPC ............................. 716/115; 716/136; 716/139

(58) Field of Classification Search
USPC .......................................... 716/115, 136, 139
See application file for complete search history.

(56) References Cited

U.S. PATENT DOCUMENTS

| 6,363,516 | B1 * | 3/2002 | Cano et al. .................... 716/115 |
| 2004/0158421 | A1 | 8/2004 | Iwanishi | |
| 2006/0242612 | A1 * | 10/2006 | Iwanishi ........................ 716/5 |
| 2011/0239178 | A1 * | 9/2011 | Yamashita .................... 716/122 |

FOREIGN PATENT DOCUMENTS

| JP | 2001-217315 A | 8/2001 |
| JP | 2002-270775 A | 9/2002 |
| JP | 2003-44540 A | 2/2003 |
| JP | 2004-185374 A | 7/2004 |
| JP | 2005-63275 A | 3/2005 |

* cited by examiner

*Primary Examiner* — Vuthe Siek
(74) *Attorney, Agent, or Firm* — Fujitsu Patent Center

(57) ABSTRACT

A design assisting apparatus includes a memory configured to store routing information representing first wire line from wire lines of a module belonging to a first layer of a semiconductor circuit having a plurality of layers, the first wire line likely to become either one of an aggressor net and a victim net in a crosstalk noise check performed on wire lines of a module belonging to a second layer hierarchically higher than the first layer, and a processor configured to perform a wire line identifying operation identifying second wire line within the module belonging to the second layer, and likely to become either one of an aggressor net and a victim net in the crosstalk noise check performed on the first wire line represented by the routing information stored on the memory.

8 Claims, 15 Drawing Sheets

ASSISTING APPARATUS, METHOD, AND PROGRAM FOR CHECKING CROSSTALK NOISE BETWEEN HIERARCHIZED MODULES IN A SEMICONDUCTOR CIRCUIT

CROSS-REFERENCE TO RELATED APPLICATION(S)

This application is based upon and claims the benefit of priority of the prior Japanese Patent Application No. 2010-253347, filed on Nov. 12, 2010, the entire contents of which are incorporated herein by reference.

FIELD

The embodiments discussed herein are related to a design assisting apparatus, method, and program.

BACKGROUND

According to one of the related-art layout design methods of semiconductor integrated circuit such as large scale integration (LSI), a circuit partitioned into a plurality of blocks by function is hierarchically layered and then layout-designed on a per layer basis. Design data are then collected to perform the whole system design.

A crosstalk noise check is typically performed in parallel with the layout design. In a typical method, for example, a layout is designed while a noise check is performed to make sure that no crosstalk noise is generated. All layers are expanded with the layout of the entire semiconductor circuit completed (all the placing and routing completed), and the crosstalk noise check is performed on all the wire lines.

A designer may perform a variety of layout designs to make sure that no crosstalk noise is generated in a layer design phase. For example, line spacing is widened such that no effect is caused by another wire line. For shielding purposes, a ground wire line may be interposed between wire lines presenting a problem.

In another known method, a driving power of an aggressor wire line or a victim wire line is adjusted in the layer layout phase. In yet another method, crosstalk noise is prevented from being generated on a hierarchically high layer by arranging a wiring inhibit area beforehand within a hierarchically low layer.

In addition to the above layout methods, the following methods are also available. In one method, check results of a hierarchically low layer are organized in a library and then added to the check results of a hierarchically high layer in the checking of a net linking the hierarchically low layer to the hierarchically high layer. In another method, lengths of parallel running wire lines in layers are summed. If the sum of the wire lines exceeds a reference line length, an error is suspected, and a crosstalk location is thus identified.

Related arts are described in Japanese Laid-open Patent Publication No. 2005-63275, Japanese Laid-open Patent Publication No. 2002-270775, Japanese Laid-open Patent Publication No. 2003-44540, Japanese Laid-open Patent Publication No. 2001-217315, and Japanese Laid-open Patent Publication No. 2004-185374.

The method of expanding all the layers with the layout of the entire semiconductor circuit completed, and performing the crosstalk noise check on all the wire lines has the problem discussed below. A data size greatly increases as the number of layers increases, and a memory used in a computer is occupied by data of the wire lines. The calculation speed of the computer is reduced.

Even if the crosstalk noise is controlled as much as possible by improving the layout design, the layout of a block at a layer level may remain pending in the layer design. For example, in the layout of a particular block, a driver driving power may remain unknown, a wire line extending to another layer may be present, wire lines in the vicinity of a boundary may include one extending to a driver or a receiver, and the effect of a wire line on an adjacent block is unknown. In such a case, the crosstalk noise is difficult to check correctly.

The method of widening the line spacing and the shielding method of interposing the ground wire line between the problematic wire lines are also associated with an inefficient layout problem such as an introduction of a dead space in the semiconductor circuit and an increase in a die size.

The layout constraint is imposed as described above to perform the crosstalk noise check correctly, and the crosstalk noise is also reduced. Such a method has a limited effect in current LSIs.

The check results of the hierarchically low layer are organized in the library and then added to the check results of the hierarchically high layer. With this method, however, the checking of the crosstalk noise is difficult because a wire line passing above and a wire line adjacent to a boundary in the hierarchically low layer are not accounted for.

In the method, the lengths of parallel running wire lines in layers are summed. If the sum of the wire lines exceeds a reference line length, an error is suspected, and a crosstalk location is identified. The summing of the lengths of the parallel running wire lines alone leads no correct crosstalk noise check. The checking of the crosstalk noise is difficult because the wire line passing above the low layer and the wire line adjacent to the boundary in the hierarchically low layer are not accounted for. With this method, the crosstalk noise check is not correctly performed.

SUMMARY

A design assisting apparatus includes a memory configured to store routing information representing first wire line from wire lines of a module belonging to a first layer of a semiconductor circuit having a plurality of layers, the first wire line likely to become either one of an aggressor net and a victim net in a crosstalk noise check performed on wire lines of a module belonging to a second layer hierarchically higher than the first layer, and a processor configured to perform a wire line identifying operation identifying second wire line within the module belonging to the second layer, and likely to become either one of an aggressor net and a victim net in the crosstalk noise check performed on the first wire line represented by the routing information stored on the memory.

The object and advantages of the invention will be realized and attained at least by the elements, features, and combinations particularly pointed out in the claims.

It is to be understood that both the foregoing general description and the following detailed description are exemplary and explanatory and are not restrictive of the invention, as claimed.

DESCRIPTION OF EMBODIMENTS

First Embodiment

Figure 1:
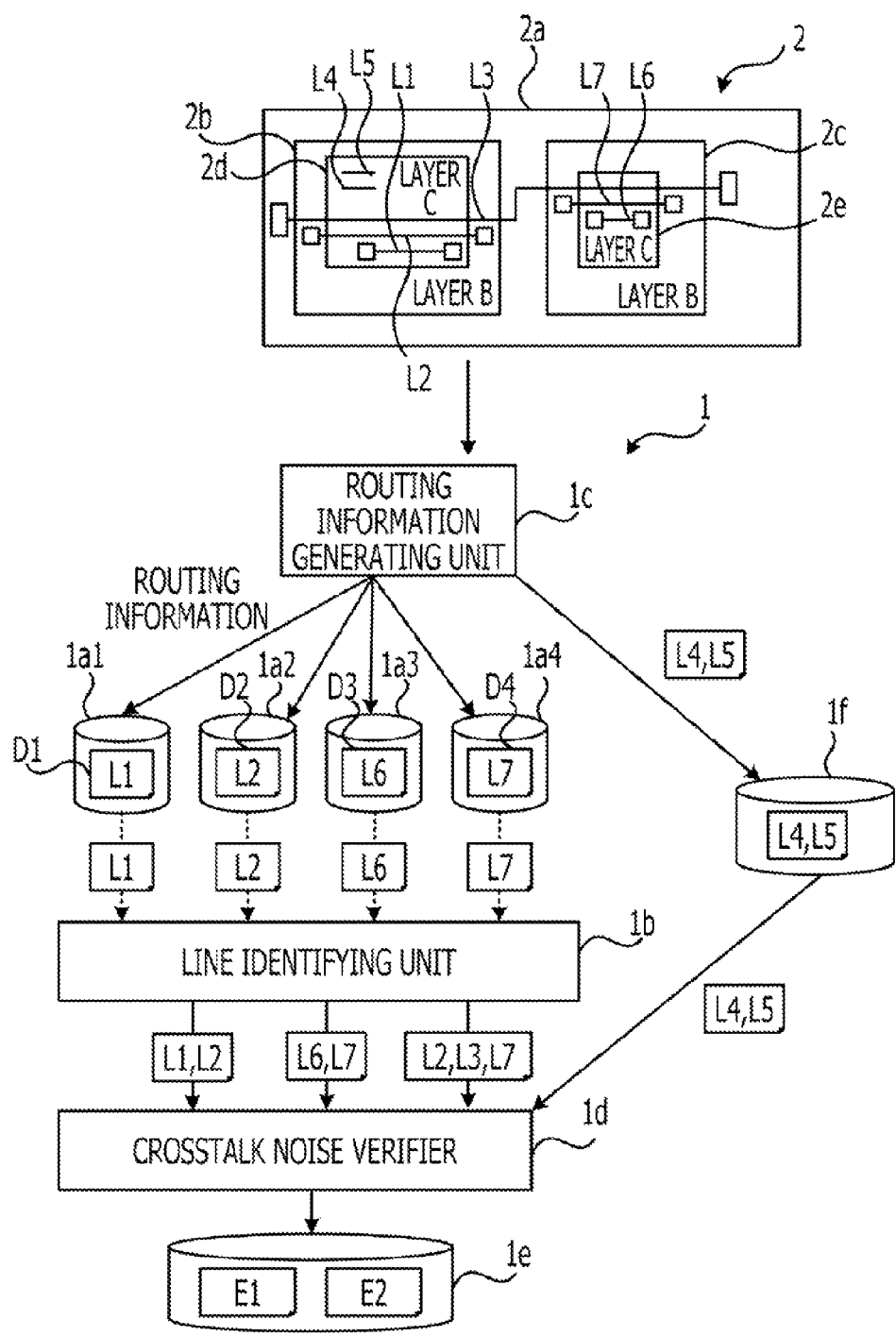
FIG. 1 generally illustrates a design assisting apparatus of a first embodiment.

FIG. 1 generally illustrates a design assisting apparatus 1 of a first embodiment.

The design assisting apparatus 1 of FIG. 1 is used to perform a layout design of a semiconductor circuit having a plurality of layers.

FIG. 1 illustrates as a design target a semiconductor integrated circuit model 2 having a plurality of layers. The semiconductor integrated circuit model 2 includes three layers. The semiconductor integrated circuit model 2 is partitioned and placed by functional block. In the discussion of the first embodiment, each block is referred to as a module.

The semiconductor integrated circuit model 2 includes a module 2a on a hierarchically top layer (layer A). The module 2a includes two modules 2b and 2c belonging to a layer (layer B) lower than the topmost layer by one layer. The module 2b includes a module 2d belonging to a layer (layer C) lower than the topmost layer by two layers. The module 2c includes a module 2e belonging to the layer C.

The design assisting apparatus (for example, a computer) 1 of the embodiment includes memories 1a1, 1a2, 1a3, and 1a4, and line identifying unit 1b.

The memory 1a1 stores routing information related to a wire line likely to become an aggressor net (net giving a crosstalk effect) or a victim net (net receiving a crosstalk effect), from the wire lines of the module belonging to the first layer of the semiconductor integrated circuit model 2, with respect to a wire line of a module belonging to the second layer as any layer hierarchically higher than the first layer.

In the discussion that follows, the first layer is set as the layer C as the bottommost layer. In this case, the second layer includes the layer A and the layer B.

The memory 1a1 stores routing information D1 related to a wire line L1 likely to become an aggressor net or a victim net, from wire lines L1, L4, and L5 of the module 2d belonging to the layer C, to a wire line L2 of the module 2b belonging the layer B and a wire line L3 of the module 2a belonging to the layer A.

The routing information D1 may be generated by a routing information generating unit 1c. The routing information generating unit 1c extracts a wire line likely to become one of an aggressor net and a victim net, output of the wire lines L1, L4, and L5 of the module 2d, to the wire line L2 of the module 2b and the wire line L3 of the module 2a. As a result of extraction, the routing information generating unit 1c determines that the wire line L1 is likely to be one of the aggressor net and the victim net to the wire line L2 and the wire line L3, and generates the routing information D1. The routing information generating unit 1c also determines the wire lines L4 and L5 are not likely to become either one of the aggressor net and the victim net to the wire lines of the module 2b and the module 2a. The determination rule is discussed with reference to a second embodiment.

In the generation of the routing information D1, the routing information generating unit 1c excludes the wire line L6 of the module 2e and the wire line L7 of the module 2c as the target of the routing information D1. More specifically, the routing information generating unit 1c generates the routing information with the modules 2a, 2b, and 2d treated as one process unit, and the modules 2a, 2c, and 2e treated as one process unit. In this way, an amount of calculation in the generation of the routing information is reduced.

After generating the routing information D1, the routing information generating unit 1c sets the first layer at the layer B higher than the layer C by one layer, and generates routing information of the module 2b belonging to the layer B. The second layer becomes the layer A at the topmost layer. More specifically, the routing information generating unit 1c extracts a wire line likely to become either one of the aggressor net and the victim net, i.e., the wire line L2 of the module 2b, to the wire line L3 of the module 2a. Through the extraction operation, the routing information generating unit 1c determines that the wire line L2 is likely to be one of the aggressor net and the victim net to the wire line L3, and generates the routing information D2 related to the wire line L2. The routing information generating unit 1c then stores the generated routing information D2 on the memory 1a2.

The routing information generating unit 1c has generated the routing information of the modules 2a, 2b, and 2d as the process unit. The routing information generating unit 1c then generates the routing information of the module 2a, 2c, and 2e as the process unit. After generating the routing information D2, the routing information generating unit 1c sets the first layer at the layer C as the bottommost layer again, and generate the routing information of the module 2e belonging to the layer C. More specifically, the routing information generating unit 1c extracts a wire line likely to become either one of the aggressor net and the victim net, i.e., the wire line L6 of the module 2e, to the wire line L7 of the module 2c and the wire line L3 of the module 2a. Through the extraction operation, the routing information generating unit 1c determines that the wire line L6 is likely to be either one of the aggressor net and the victim net to the wire line L7, and generates the routing information D3 related to the wire line L6. The routing information generating unit 1c then stores the generated routing information D3 on the memory 1a3.

After generating the routing information D3, the routing information generating unit 1c sets the first layer at the layer B higher than the layer C as the bottommost layer by one layer, and generate the routing information of the module 2c belonging to the layer B. More specifically, the routing information generating unit 1c extracts a wire line likely to become either one of the aggressor net and the victim net, i.e., the wire line L7 of the module 2c, to the wire line L3 of the module 2a. Through the extraction operation, the routing information generating unit 1c determines that the wire line L7 is likely to be either one of the aggressor net and the victim net to the wire line L3, and generates the routing information D4 related to the wire line L7. The routing information generating unit 1c then stores the generated routing information D4 on the memory 1a4.

The line identifying unit 1b then identifies a wire line eligible for a crosstalk noise calculation. More specifically, the line identifying unit 1b identifies a wire line within a module belonging to the second layer, and likely to become either one of the aggressor net and the victim net to the wire lines of the routing information D1-D4 stored on the memories 1a1-1a4. The line identifying unit 1b, when identifying a wire line eligible for a crosstalk noise calculation on a module at a given layer, identifies a wire line becoming either one of the aggressor net and the victim net to the wire lines of the routing information of all the modules belonging to the layer lower than the given layer.

The line identifying unit 1b may identify on the module 2b a wire line eligible for the crosstalk noise calculation. More specifically, the line identifying unit 1b identifies a wire line within the module 2b (unconnected to an upper layer), i.e., the wire line L2 likely to become either one of the aggressor net and the victim net to the wire line L1 of the routing information D1. Through the identification operation, the crosstalk noise value with the wire line L1 being the aggressor net and the wire line L2 being the victim net is ready to be calculated. The crosstalk noise value with the wire line L1 being the victim net and the wire line L2 being the aggressor net is ready to be calculated.

The line identifying unit 1b, when identifying a wire line eligible for the crosstalk noise calculation on the module 2c, identifies a wire line within the module 2c, i.e., the wire line L7 likely to become either one of the aggressor net and the victim net to the wire line L6 of the routing information D3. Through the identification operation, the crosstalk noise value with the wire line L6 being the aggressor net and the wire line L7 being the victim net is ready to be calculated. The crosstalk noise value with the wire line L6 being the victim net and the wire line L7 being the aggressor net is ready to be calculated.

The line identifying unit 1b, when identifying a wire line eligible for the crosstalk noise calculation on the module 2a, identifies a wire line within the module 2a, i.e., the wire line L3 likely to become either one of the aggressor net and the victim net to the wire lines L2 and L7 of the routing information D2 and D4. Through the identification operation, the crosstalk noise values with the wire lines L2 and L7 being the aggressor nets and the wire line L3 being the victim net are ready to be calculated. The crosstalk noise values with the wire lines L2 and L7 being the victim nets and the wire line L3 being the aggressor net are ready to be calculated.

The design assisting apparatus 1 of the embodiment further includes a crosstalk noise verifier 1d verifying the crosstalk noise of the semiconductor integrated circuit model 2 in accordance with the identification results of the line identifying unit 1b.

As illustrated in FIG. 1, the crosstalk noise verifier 1d calculates the crosstalk noise value with the wire line L1 being the aggressor net and the wire line L2 being the victim net. The crosstalk noise verifier 1d also calculates the crosstalk noise value with the wire line L1 being the victim net and the wire line L2 being the aggressor net. Similarly, the crosstalk noise verifier 1d calculates the crosstalk noise value with the wire line L6 being the aggressor net and the wire line L7 being the victim net. The crosstalk noise verifier 1d also calculates the crosstalk noise value with the wire line L6 being the victim net and the wire line L7 being the aggressor net. The crosstalk noise verifier 1d calculates the crosstalk noise values with the wire lines L2 and L7 being the aggressor net and the wire line L3 being the victim net. The crosstalk noise verifier 1d also calculates the crosstalk noise value with the wire line L2 and L7 being the victim net and the wire line L3 being the aggressor net.

If the calculated crosstalk noise value is equal to or higher than a constant value, the crosstalk noise verifier 1d determines that the calculated crosstalk noise value is an error verification. The crosstalk noise verifier 1d then outputs a combination of the wire lines L1 and L2 to the accumulator 1e as an error result. As illustrated in FIG. 1, an error result E1 is stored on the accumulator 1e. The error result E1 indicates that the crosstalk noise value with the wire line L1 being the aggressor net and the wire line L2 being the victim net is the error verification.

The routing information generating unit 1c may retrieve combination information indicating a combination of the wire lines L4 and L5 that permits the calculation of the crosstalk noise value to be completed within the module 2b, and may store the combination information on a memory 1f. In such a case, the crosstalk noise verifier 1d verifies the crosstalk noise value of the combination of the wire lines L4 and L5 stored on the memory 1f. If the verification results indicate that the crosstalk noise value is equal to or higher than the constant value, the crosstalk noise value is determined as an error verification. The combination of the wire lines L4 and L5 is output to an accumulator 1e as an error result E2.

The design assisting apparatus 1 calculates the crosstalk noise between a wire line identified by the line identifying unit 1b as being likely to become either one of the aggressor net and the victim net and a wire line likely to become either one of the aggressor net and the victim net stored on the memories 1a1 through 1a4. The crosstalk noise value may be calculated at each layer. A memory having a small memory capacity may be used to calculate the noise. The verification of the crosstalk noise is performed at a high speed. A high-accuracy crosstalk noise verification is performed without the need for expanding all layers at a time.

The line identifying unit 1b, the routing information generating unit 1c, and the crosstalk noise verifier 1d may be implemented using a function of a central processing unit (CPU) of the design assisting apparatus 1. The memories 1a1, 1a2, 1a3, 1a4, and 1f and the accumulator 1e may be implemented using a data storage area of a random-access memory (RAM) or a hard disc drive (HDD) of the design assisting apparatus 1.

Second Embodiment

A design assisting apparatus 10 of a second embodiment performs a layout design of a semiconductor integrated circuit having a plurality of layers. In the discussion that follows, the semiconductor integrated circuit is an LSI.

Figure 2:
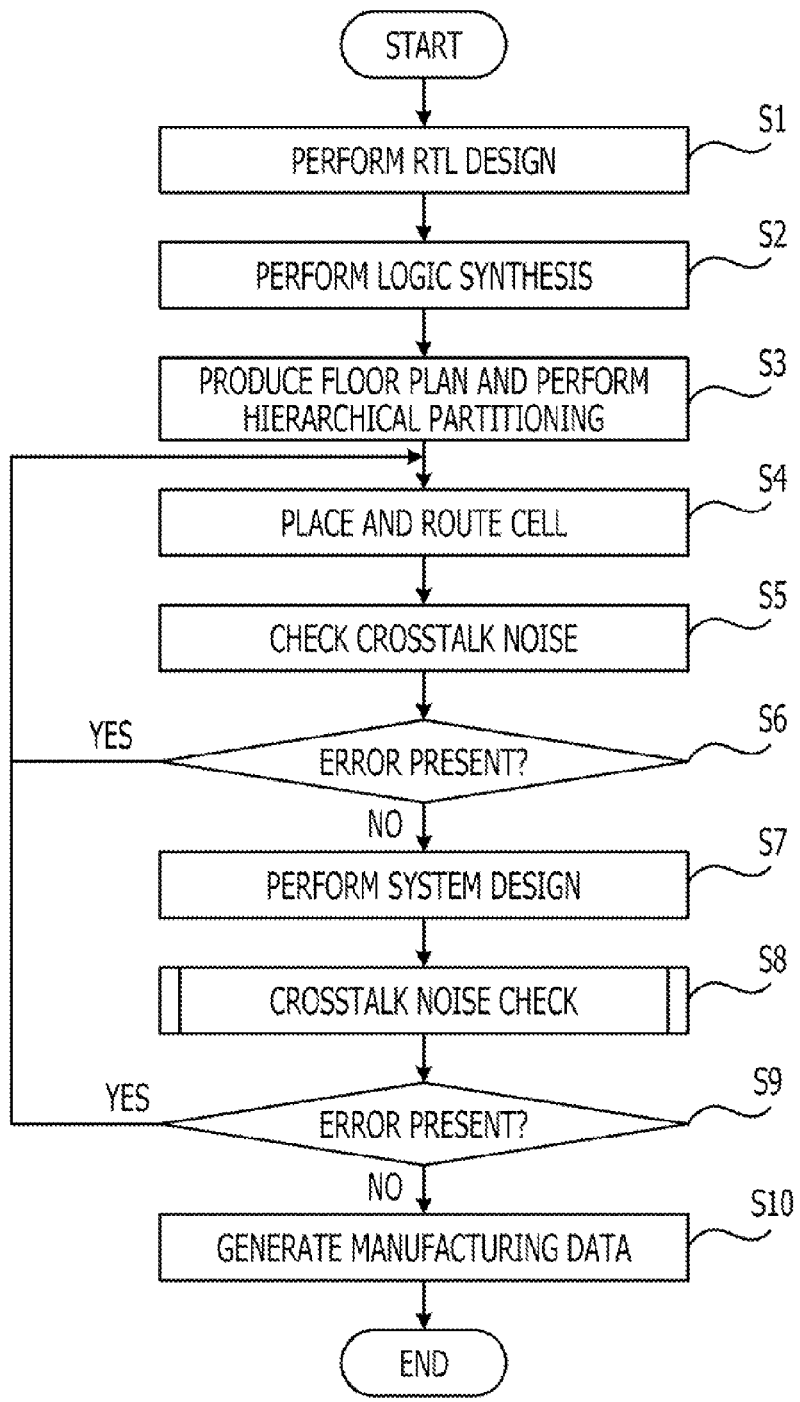
FIG. 2 illustrates a process flow of LSI design.

FIG. 2 illustrates an example of process flow of LSI design.

S1 Using a specific architecture performing a desired function, a designer designs an LSI in accordance with register transfer level (RTL) description referred to as Verilog hardware description language (HDL) or VHDL (VHSIC HDL). This design is referred to as RTL design, and is a first operation of the process flow of the LSI design. Behavioral design may occasionally be performed in advance using a behavior model. For simplicity of explanation, such a behavioral design is not discussed here.

In the RTL design phase, the RTL described LSI is logically verified and the RTL description is improved until the circuit is free from any problem. Such an operation is omitted in FIG. 2.

S2 Logic synthesis is then performed when the RTL design is complete. The logic synthesis is performed to generate a net list from the RTL design. The net list is circuit information of a circuit constructed of real circuit elements. In the logic synthesis, a condition of synthesis constraints such an appropriate timing constraint is set, and the logic synthesis is performed such that the circuit of the generated net list operates at a desired operation frequency. The logic synthesis is followed by the layout design in S3 and subsequent operations performed in accordance with the generated net list.

S3 The designer creates a floor plan that determines an approximate location of each module forming a major LSI. In the floor plan, each module to be layout-processed is hierarchically partitioned, and where to place the partitioned module within a layout area is then determined. In the hierarchically partitioned module at a hierarchically low layer is referred to as a "sub chip." Through the hierarchically partitioning, the crosstalk estimation within the sub chip in S5 to be discussed later is performed separately. Processing proceeds to S4.

S4 Subsequent to the hierarchically partitioning, design is performed on the hierarchically partitioned sub chips on a per sub-chip basis. In the design of each sub chip, the designer places and routes cells using the design assisting apparatus 10. Processing proceeds to S5.

S5 The designer issues to the design assisting apparatus 10 an instruction to perform a crosstalk noise check on results of actual routing on a per sub chip basis. Processing proceeds to S6. FIG. 2 illustrates the crosstalk noise check with a layout verification and a timing verification omitted.

S6 The design assisting apparatus 10 performs the crosstalk noise check, and the designer may receive from the design assisting apparatus 10 a notification to the effect that an error is present (yes from S6). Processing returns to S4, and the designer reviews the cell placement and routing. If the designer receives from the design assisting apparatus 10 a notification to the effect that no error is present (no from S6), processing proceeds to S7.

The designer continues to review the placement and routing on a per sub-chip basis until no error is detected in the crosstalk noise check.

S7 The designer completes sub-chip design. After the crosstalk noise check is successfully completed on a per sub-chip basis, the designer then performs a system design of the LSI. In the system design of the LSI, the designer performs a placement and routing process on an upper layer including the sub chips. A main-chip database (DB) and a sub-chip DB are generated in the system design. The generated main-chip DB and sub-chip DB are stored on a storage device of the design assisting apparatus 10.

S8 Upon completing the system design, the designer performs the crosstalk noise check. The crosstalk noise check in S8 includes checking the crosstalk noise between layers.

More specifically, the designer issues a crosstalk noise check instruction to the design assisting apparatus 10 when the sub-chip design is partially or entirely complete. The design assisting apparatus 10 performs the crosstalk noise check on a sub chip as a block box if the sub chip is not completed in design.

S9 If the results of the crosstalk noise check of the design assisting apparatus 10 indicate that an error is present in the whole LSI (yes from S9), processing returns to S4 to review the design of each sub chip. If no error is present in the whole LSI (no from S9), processing proceeds to S10.

S10 The designer generates manufacturing data for the LSI when the whole LSI has no longer any error in the crosstalk noise check. The designer thus completes the circuit design, and proceeds to the manufacturing phase of the LSI.

The crosstalk noise check in S5 may be omitted. In such a case, the crosstalk noise check of each sub chip is performed in S8.

The design assisting apparatus 10 thus designs the sub chip and performs the crosstalk noise check on the entire chip. A hardware configuration and function of the design assisting apparatus 10 are described below in detail.

Figure 3:
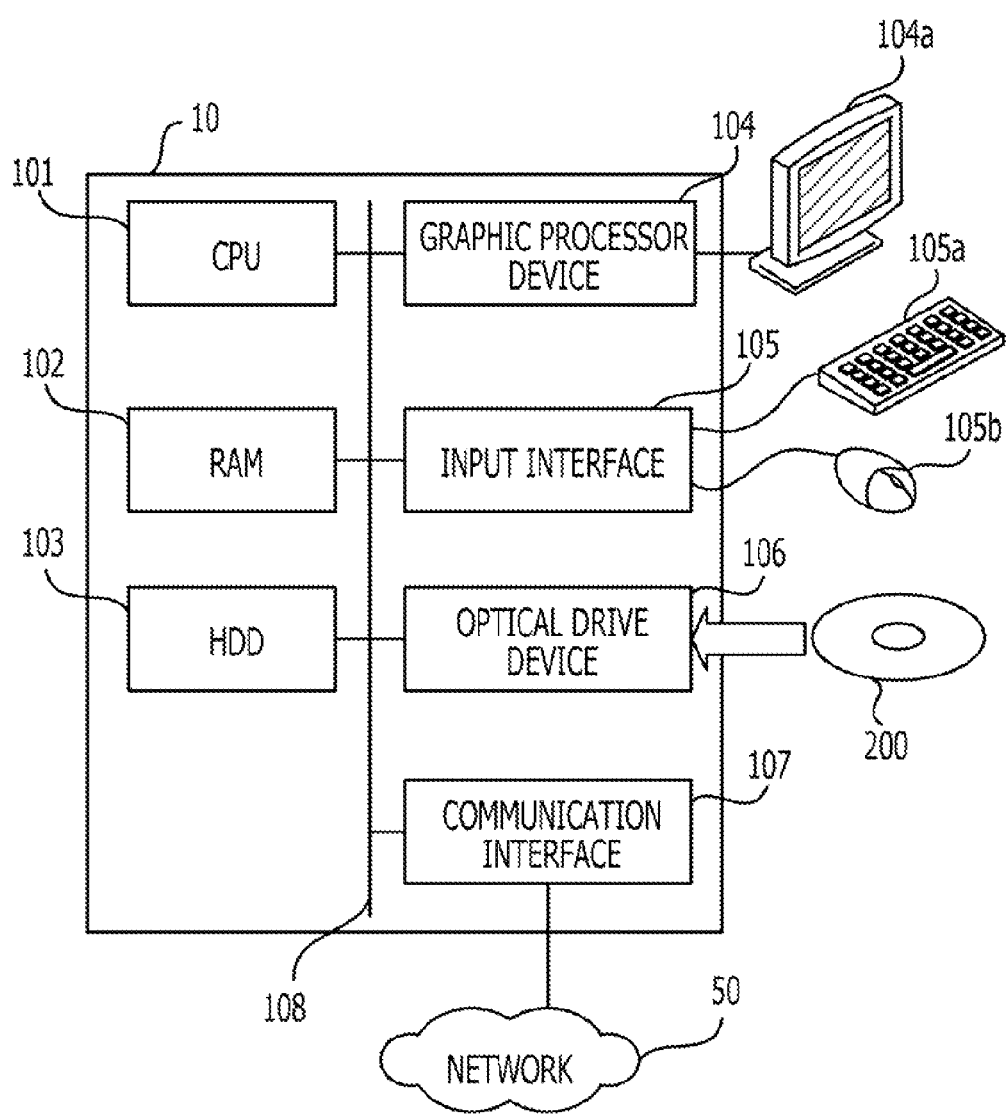
FIG. 3 illustrates a hardware structure of a design assisting apparatus of a second embodiment.

FIG. 3 illustrates the hardware configuration of a design assisting apparatus 10 of the second embodiment. The design assisting apparatus 10 is generally controlled by a CPU 101. The CPU 101 is connected to a RAM 102 and a plurality of peripheral devices via a bus 108.

The RAM 102 is used as a main storage device of the design assisting apparatus 10. The RAM 102 temporarily stores at least part of an operating system (OS) to be executed by the CPU 101 and application programs. The RAM 102 also stores a variety of data used by the CPU 101.

The peripheral devices connected to the bus 108 include HDD 103, graphic processor device 104, input interface 105, optical drive device 106, and communication interface 107.

The HDD 103 writes and reads data on an internal disc magnetically. The HDD 103 is used as an auxiliary storage device of the design assisting apparatus 10. The HDD 103 stores the OS, the application programs, and the variety of data. A semiconductor memory such as a flash memory may also be used as the auxiliary storage device.

The graphic processor device 104 is connected to the monitor 104a. In response to an instruction from the CPU 101, the graphic processor device 104 causes an image to be displayed on the monitor 104a. The monitor 104a may be a cathode ray tube (CRT) display device or a liquid-crystal display device.

The input interface 105 is connected to a keyboard 105a and a mouse 105b. The input interface 105 transfers signals from the keyboard 105a and the mouse 105b to the CPU 101. The mouse 105b is one example of pointing devices. Another pointing device may also be used. The other pointing devices include, for example, a touchpanel, tablet, touchpad, and trackball.

The optical drive device 106 reads data, recorded on an optical disc 200, using laser light. The optical disc 200 is a portable recording medium having data recorded thereon and readable through light reflection. For example, the optical disc 200 may be Blu-ray disc (registered trademark), digital versatile disc (DVD), DVD-RAM, compact disc read-only memory (CD-ROM), compact disc recordable (CD-R), compact disc rewritable (CD-RW), or the like.

The communication interface 107 is connected to a network 50. The communication interface 107 exchanges data with another computer or a communication apparatus via the network 50.

Functions of the design assisting apparatus 10 of the embodiment are thus performed on the above-described hardware configuration. The functions of the design assisting apparatus 10 having the hardware configuration are described below.

Figure 4:
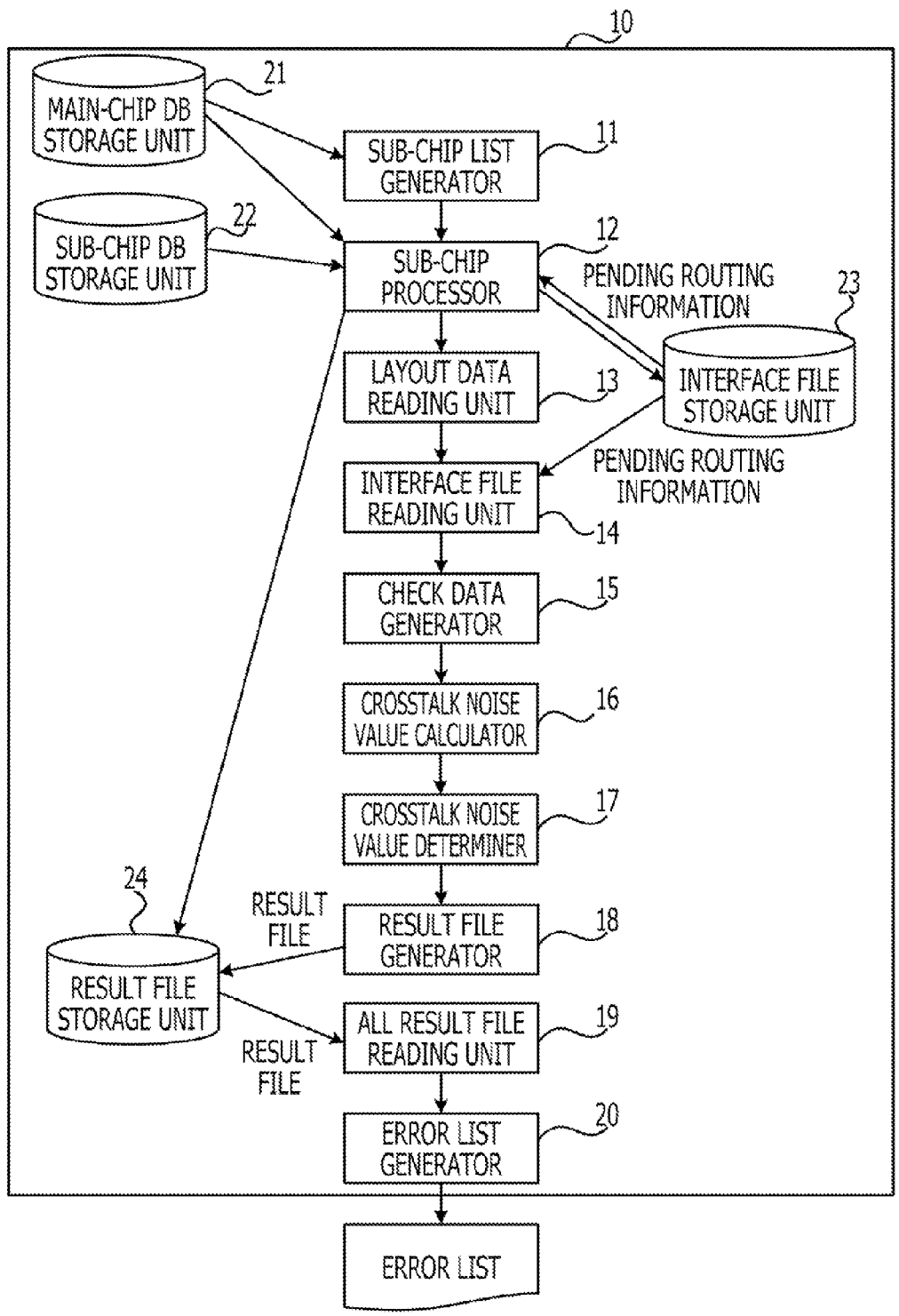
FIG. 4 is a functional block diagram of the design assisting apparatus.

FIG. 4 is a functional block diagram of the design assisting apparatus 10.

The design assisting apparatus 10 includes sub-chip list generator 11, sub-chip processor 12, layout data reading unit 13, interface file reading unit 14, check data generator 15, crosstalk noise value calculator 16, crosstalk noise value determiner 17, result file generator 18, all result file reading unit 19, error list generator 20, main-chip DB storage unit 21, sub-chip DB storage unit 22, interface file storage unit 23, and result file storage unit 24.

The sub-chip list generator 11 generates a list of sub chips in accordance with a main-chip DB stored on the main-chip DB storage unit 21. The main-chip DB stores the layout data of the whole LSI.

Figure 5:
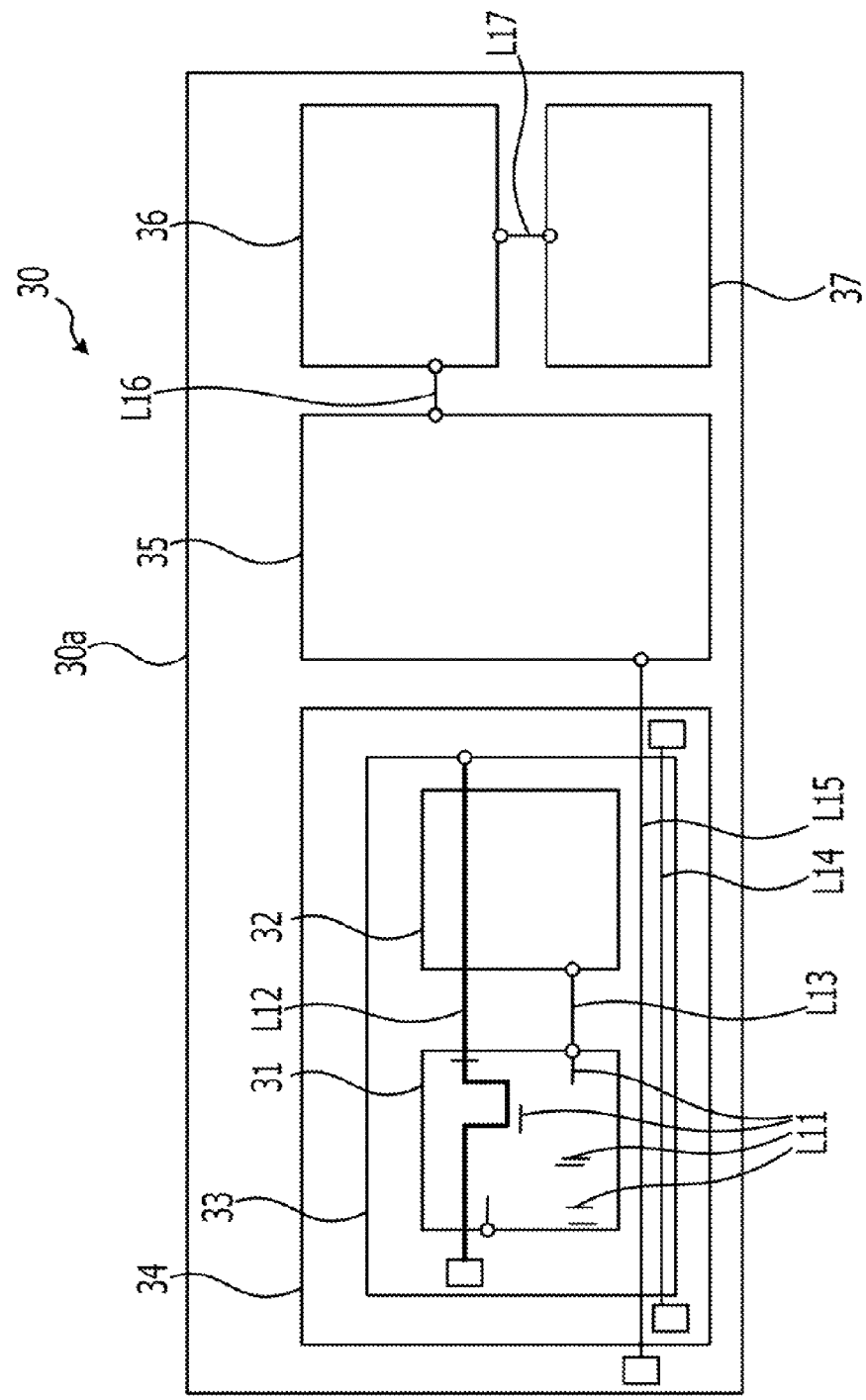
FIG. 5 illustrates a structure of a main-chip database (DB)

FIG. 5 illustrates a structure of the main-chip DB.

The floor plan and the hierarchical partitioning result in circuit blocks of four layers as illustrated in FIG. 5.

The sub chips belonging to the bottommost layer (fourth layer) of an LSI 30 include a sub chip 31 and a sub chip 32. The sub chip 31 and the result file storage unit 24 are parallel to each other. If viewed from the sub chip 31, the sub chip belonging to a third layer right above the sub chip 31 is a sub chip 33. The sub chip belonging to a second layer right above the sub chip 33 is a sub chip 34. A first layer as the topmost layer is a main chip 30a.

The second layer of the LSI 30 also includes sub chips 35, 36, and 37 in addition to the sub chip 34. The sub chips 34-37 are in a parallel relationship to each other at the second layer.

The sub chips 35 and 36 include hierarchically lower sub chips, respectively, and the sub chip 37 includes no hierarchically lower sub chip. As illustrated in FIG. 5, the sub chips 35-37 are illustrated as black boxes.

The main chip 30a and the sub chips 31-37 have undergone the routing process. For example, wire lines L11 are arranged on the sub chip 31, and wire lines L12 and L13 are arranged on the sub chip 33. A wire line L14 is arranged on the sub chip 34. Wire lines L15, L16, and L17 are arranged on the main chip 30a.

The sub-chip processor 12 expands the bottommost layer to the upper layer right above the bottommost layer in order, and performs the crosstalk noise check on all the layers when all the sub chips are laid out or when a particular sub chip regardless of the bottommost layer or the upper layer is laid out. For example, the layout data reading unit 13 expands the sub chip 31 and the immediately upper layers on the LSI 30 of FIG. 5, thereby viewing the sub chips 31, 33, 34, and the main chip 30a in a flat state. The sub-chip processor 12 thus performs the crosstalk noise check on all these layers.

The sub-chip processor 12 then stores, in an interface file, information related to a wire line having a crosstalk noise value unfixed on each sub chip with respect to one of the upper sub chips including the main chip 30a. The information is hereinafter referred to as pending routing information. The rule of the wire line providing the pending routing information is described below in detail. The sub-chip processor 12 stores the interface file on the interface file storage unit 23. The interface file is generated on a per sub chip basis.

The crosstalk noise check is performed on a region of each sub chip where the layout has been complete. If the crosstalk noise check results in an error, information of a wire line pair resulting in the error (routing error information) is written in a result file. The sub-chip processor 12 stores the result file on the result file storage unit 24. The result file is generated on a per sub chip basis.

The design assisting apparatus 10 is continuously discussed with reference to FIG. 4.

The layout data reading unit 13 reads layout data of a layout (layout position) of each sub chip of the LSI 30. The layout data reading unit 13 may read the layout data from the main-chip DB or receive the layout data read by the sub-chip list generator 11.

The interface file reading unit 14 reads an interface file of a sub chip belonging to the second layer stored on the interface file storage unit 23.

In accordance with the interface file read by the interface file reading unit 14, the check data generator 15 checks the line spacing between lines to determine whether the line pair is a target of the crosstalk noise check. The check data generator 15 thus generates data of the crosstalk noise check (check data) according to which the line pair having a line spacing equal to or smaller than a constant value is set to be a crosstalk noise check target.

The crosstalk noise value calculator 16 calculates the crosstalk noise value between wire lines using the check data generated by the check data generator 15.

Figure 6:
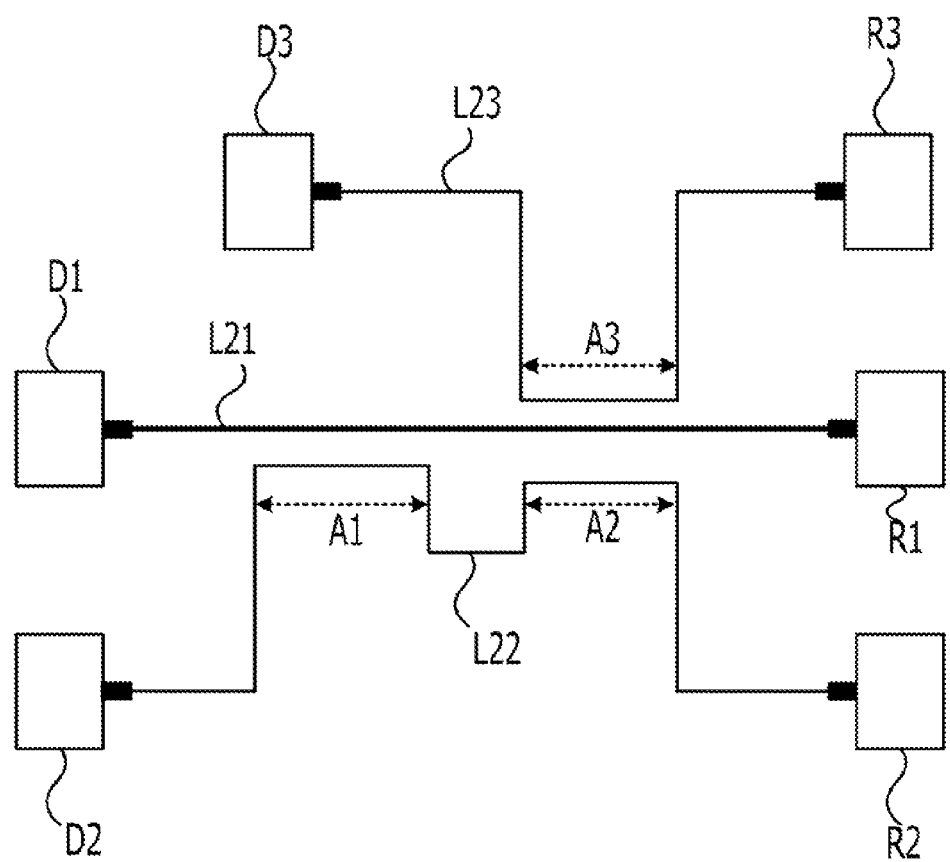
FIG. 6 illustrates a calculation method of a crosstalk noise value.

FIG. 6 illustrates an example of the calculation method of the crosstalk noise value.

As illustrated in FIG. 6, a wire line L21 between a driver cell D1 and a receiver cell R1 is specified to be a victim net through crosstalk. A wire line L22 between a driver cell D2 and a receiver cell R2 and a wire line L23 between a driver cell D3 and a receiver cell R3 are specified to be aggressor nets, respectively.

As illustrated in FIG. 6, the crosstalk noise value calculator 16 calculates the crosstalk noise value of the wire line L21 with the wire line L22 along segments A1 and A2 where the line spacing between the wire line L21 and the wire line L22 is equal to or smaller than a specific value. The crosstalk noise value calculator 16 also calculates the crosstalk noise value of the wire line L23 with the wire line L21 along a segment A3 where the line spacing between the wire line L21 and the wire line L23 is equal to or smaller than the specific value.

In the crosstalk noise calculation, the crosstalk noise value calculator 16 performs a 1:1 noise value calculation with the ratio of the victim net to the aggressor net being 1:1, and performs a 1:2 noise value calculation with the ratio of the victim net to the aggressor net being 1:2. As illustrated in FIG. 6, the 1:1 noise value calculation is performed on each of the segment A1 between the wire line L21 and the wire line L22, the segment A2 between the wire line L21 and the wire line L22, and the segment A3 between the wire line L21 and the wire line L23. The 1:1 noise values are thus calculated between the wire line L21 and the wire line L22, and between the wire line L21 and the wire line L23. The 1:2 noise value is calculated from the 1:1 noise values between the wire line L21 and each of the wire line L22 and the wire line L23.

The calculation of a 1:1 noise value Nv11 is represented by Equation (1):

$$Nv11 = \Sigma\{Ln \times Ka \times f(C, L)\} \leq LX1 \tag{1}$$

where Ln represents a length of a line segment where a particular net runs in parallel with a victim net side by side. As illustrated in FIG. 6, Ln is the length of each of the segments A1-A3. Ka represents a coefficient of a driver driving power between the victim net and the aggressor net. f(C,L) represents a relaxation function and is determined by a distance between the victim net and the aggressor net. LX1 represents a limitation value to the 1:1 noise, and is determined by a type-based combination of the victim net and the aggressor net.

A 1:2 noise value Nv12 is calculated using Equation (2):

$$NV12 = (Nv11a + Nv11b) \times Kb \leq Lx2 \tag{2}$$

where $Nv11a$ is a 1:1 noise value between the victim net and the aggressor net 1. $Nv11b$ is a 1:1 noise value between the victim net and the aggressor net 2. Kb represents a check coefficient between the victim net and the aggressor net. Lx2 represents a limitation value to the 1:2 noise, and is determined by a type-based combination of the victim net and the aggressor net.

Referring to FIG. 6, the wire line L21 is specified to be a victim net and the wire lines L22 and L23 are specified to be aggressor nets. However, there is a possibility that the wire line L21 is an aggressor net, and that the wire lines L22 and L23 are victim nets. The crosstalk noise value calculator 16 also calculates the 1:1 noise value and the 1:2 noise value in such a case.

The design assisting apparatus 10 is continuously discussed with reference to FIG. 4.

In accordance with the limitation value prepared beforehand, the crosstalk noise value determiner 17 determines whether the crosstalk noise value between lines is equal to or lower than the limitation value. If the inter-line crosstalk noise value is higher than the limitation value, the crosstalk noise value determiner 17 determines that an error is present between the lines.

The result file generator 18 generates a result file including the routing error information of an error between the lines determined by the crosstalk noise value determiner 17. The result file generator 18 stores the generated result file on the result file storage unit 24.

The all result file reading unit 19 reads all the result files stored on the result file storage unit 24.

The error list generator 20 outputs an error list listing the routing error information written in all the result files.

A function of the sub-chip processor 12 is described in detail below.

Figure 7:
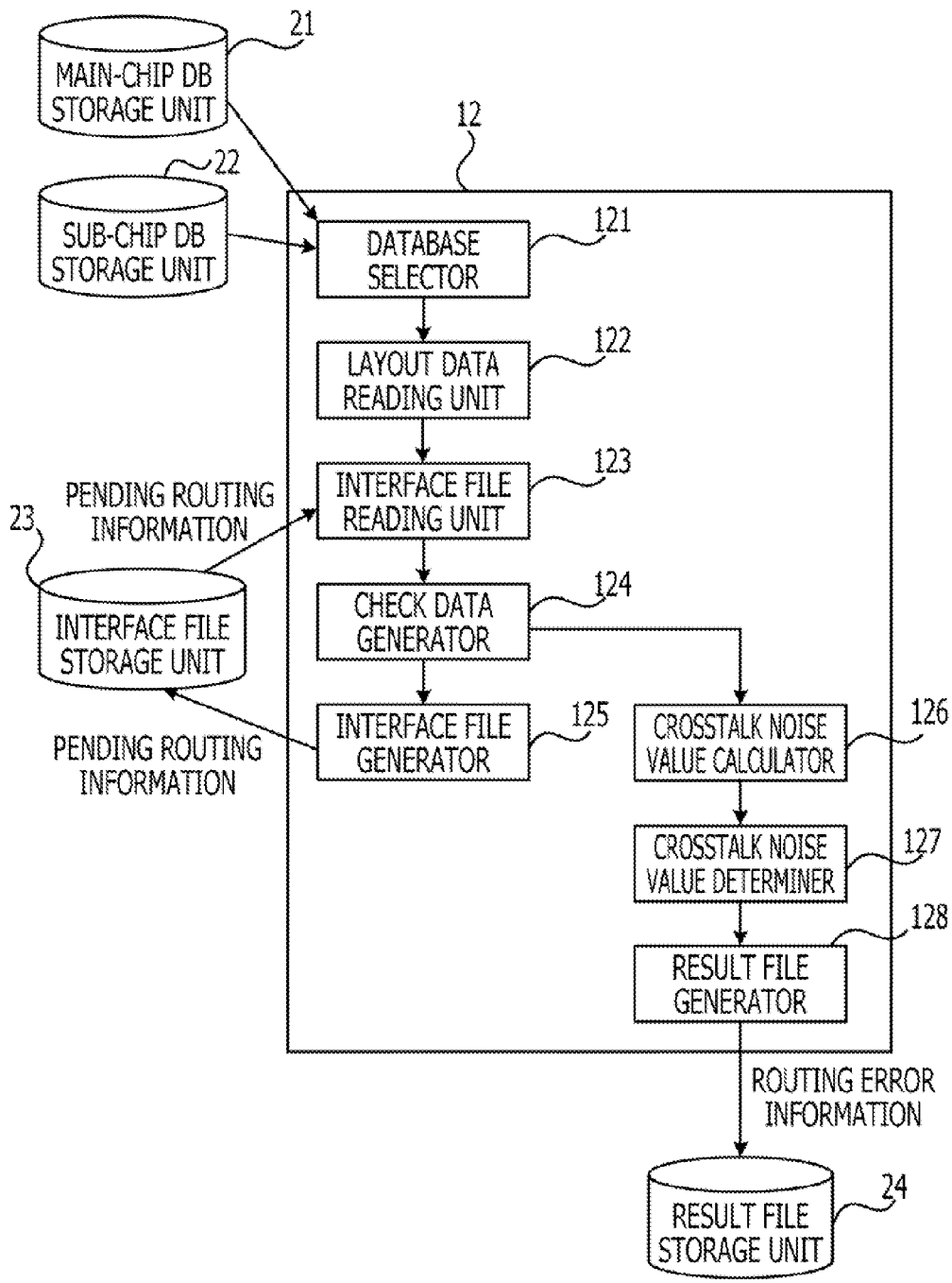
FIG. 7 is a functional block diagram of a sub-chip processor.

FIG. 7 is a functional block diagram of the sub-chip processor 12.

The sub-chip processor 12 includes database selector 121, layout data reading unit 122, interface file reading unit 123, check data generator 124, interface file generator 125, crosstalk noise value calculator 126, crosstalk noise value determiner 127, and result file generator 128.

The database selector 121 selects as the crosstalk noise check target all the sub chips from a target sub chip to all sub chips above the target sub chip to the topmost chip. The database selector 121 then reads the layout data of the selected chips from the sub-chip DB.

The layout data reading unit 122 expands all the sub chips from the target sub chip to all sub chips above the target sub chip to the topmost chip. In this case, another sub chip alongside the sub chip of interest is not expanded. For example, if the sub chip 31 is a check target on the LSI 30 of FIG. 5, the layout data reading unit 122 expands the sub chip 31, the sub chip 33, the sub chip 34, and the main chip 30a. Through this process, all the wire lines related to the crosstalk noise check of the sub chip 31 are clarified. For example, the wire lines L11 and L12 of FIG. 5 are used to perform the crosstalk noise check of the sub chip 31. In particular, the wire lines on the sub chip 31 are likely to affect the wire line L12, the wire line L4 of the sub chip 34, and the wire line L15 of the main chip 30a.

The sub chips 32, 35, 36, and 37 are not expanded yet at this point of time. These sub chips 32, 35, 36, and 37 may become check targets later. Information of a line the process of which is not complete during the expansion of the sub chip 31, the sub chip 33, the sub chip 34, and the main chip 30a is stored in the interface file and is referenced in a later process. The accuracy of noise check is not affected even if these sub chips are excluded at this point of time. The area of expansion is limited in this way such that an amount of information to be processed is reduced.

The interface file reading unit 123 determines whether an interface file of a sub chip belonging to a layer lower than the sub chip as a check target is present. If such an interface file is present, the interface file reading unit 123 reads the interface file of sub chips of all the lower layers.

The check data generator 124 identifies, as the pending routing information of a wire line on a check-target sub chip having the crosstalk noise value thereof unfixed, information related to the wire line identified in accordance with the following rules 1 through 6 out of the lines on the check-target sub chip. The check data generator 124, when identifying the pending routing information, accounts for a read interface file if such an interface file read by the interface file reading unit 123 is present.

Rule 1: All wire lines of a net included in a boundary area are identified.

Rule 2: All wire lines of an aggressor net to be handled as an error out of the wire lines identified according to the rule 1 are identified.

Rule 3: All wire lines on the upper layers and all the wire lines of the aggressor net to be handled as an error are identified.

Rule 4: All wire lines connected to a terminal are identified.

Rule 5: All wire lines of an aggressor net to be handled as an error out of the wire lines identified according to the rule 4 are identified.

Rule 6: All wire lines of an aggressor net with the wire line specified to be a victim net according to the rule 3 and rule 5 are identified.

The check data generator 124 generates the check data used to calculate the crosstalk noise values of all the nets and wire lines of a sub chip present after expansion.

The check data is data related to a line pair in each of the following patterns 1 through 3.

Pattern 1: Pair of wire lines, one wire line identified according to the rule 2 and specified as a victim net, and the other wire line being a net having the crosstalk noise calculation completed within the check-target sub chip, and specified as an aggressor net.

Pattern 2: Pair of wire lines, one wire line identified according to the rule 6 and specified as a victim net, and the other wire line being a net having the crosstalk noise calculation completed within the check-target sub chip, and specified as an aggressor net.

Pattern 3: Pair of wire lines having the crosstalk noise calculation completed within the check-target sub chip.

The interface file generator 125 generates the interface file including the pending routing information identified by the check data generator 124. The interface file generator 125 then stores the generated interface file on the interface file storage unit 23.

In the same manner as the calculation method of the crosstalk noise value calculator 16, the crosstalk noise value calculator 126 calculates the crosstalk noise value of the check data generated by the check data generator 124.

The crosstalk noise value determiner 127 determines, according to the limitation value prepared beforehand, whether the crosstalk noise value calculated by the crosstalk noise value calculator 126 is equal to or lower than the limitation value. If a wire line pair having a crosstalk noise value higher than the limitation value is present, these wire lines are specified as a line error.

The result file generator 128 writes, into the result file, information related to the line pair specified as the line error by the crosstalk noise value determiner 127 (routing error information), and stores the result file on the result file storage unit 24.

The routing error information written in the result file indicates check results obtained from expanding all the sub chips. This is because the crosstalk noise check is performed on all the wire lines on and above the check-target sub chip, and because a net affecting a sub chip alongside the check-target sub chip is identified according to the rule 1 and the rule 2 and is then excluded from the routing error information.

The line pair extracted according to the pattern 1 through the pattern 3 is a net correctly checked within the range of expansion. At this point of time, the line error is identified. On the other hand, all nets not correctly checked within the check-target sub chip are written in the interface file, and are then checked at a higher layer.

The crosstalk noise check performed by the design assisting apparatus 10 in S8 is described in detail with reference to a flowchart of FIG. 8.

Figure 8:
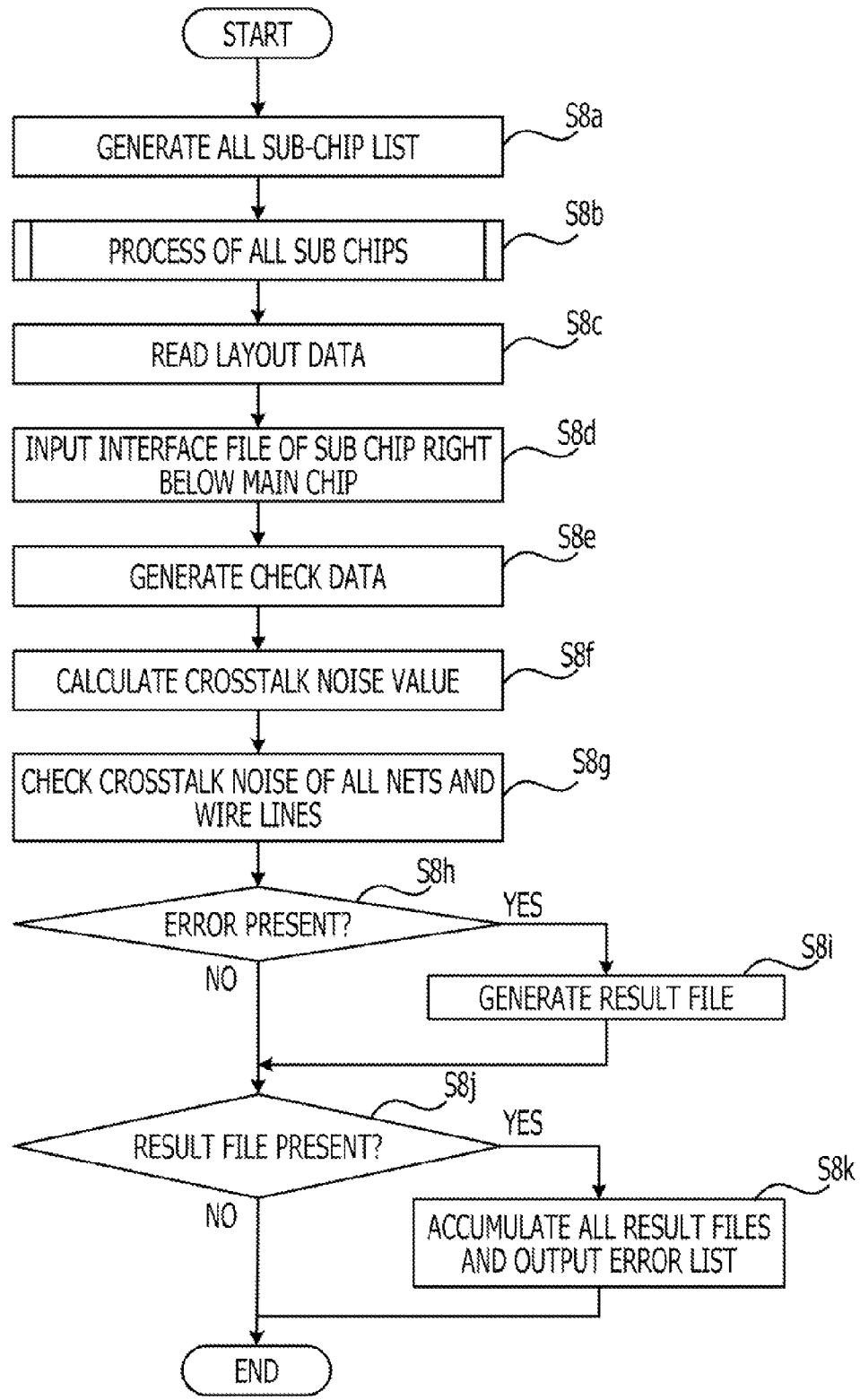
FIG. 8 is a flowchart of a check process of the crosstalk noise.

FIG. 8 is the flowchart of the crosstalk noise check process.

S8a The sub-chip list generator 11 generates a list of all sub chips in accordance with the main-chip DB and the sub-chip DB produced through the floor plan and the hierarchical partitioning.

S8b Using the generated sub-chip list, the sub-chip processor 12 generates the interface file and the result file of all sub chips ranging from the bottommost layer to an upper layer.

S8c The layout data reading unit 13 reads the layout data.

S8d The interface file reading unit 14 reads the interface file of a sub chip (second layer) right below the main chip.

S8e The check data generator 15 generates the check data in accordance with the layout data read in S8c and the interface file read in S8d.

S8f The crosstalk noise value calculator 16 calculates the crosstalk noise value in accordance with the check data.

S8g The crosstalk noise value determiner 17 performs the crosstalk noise check on a chip on the topmost layer with respect to all nets and wire lines.

S8h The crosstalk noise value determiner 17 determines in accordance with the calculation results of the crosstalk noise value in S8f whether a line pair triggering an error is present. If a line pair triggering an error is present (yes from S8h), processing proceeds to S8i. If no line pair triggering an error is present (no from S8h), processing proceeds to S8j.

S8i The result file generator 18 generates the result file. The result file generator 18 stores the generated result file on the result file storage unit 24.

S8j The all result file reading unit 19 determines whether the routing error information is present. According to the embodiment, the all result file reading unit 19 determines that the routing error information is present if the result file is present on the result file storage unit 24. If the routing error information is present (yes from S8j), processing proceeds to S8k. If no routing error information is present (no from S8j), the process of FIG. 8 ends.

S8k If the result file is present, the error list generator 20 accumulates the routing error information of all the result files and outputs the resulting routing error information as an error list. The process of FIG. 8 thus ends.

The process of the sub-chip processor 12 in S8b is described below in detail.

Figure 9:
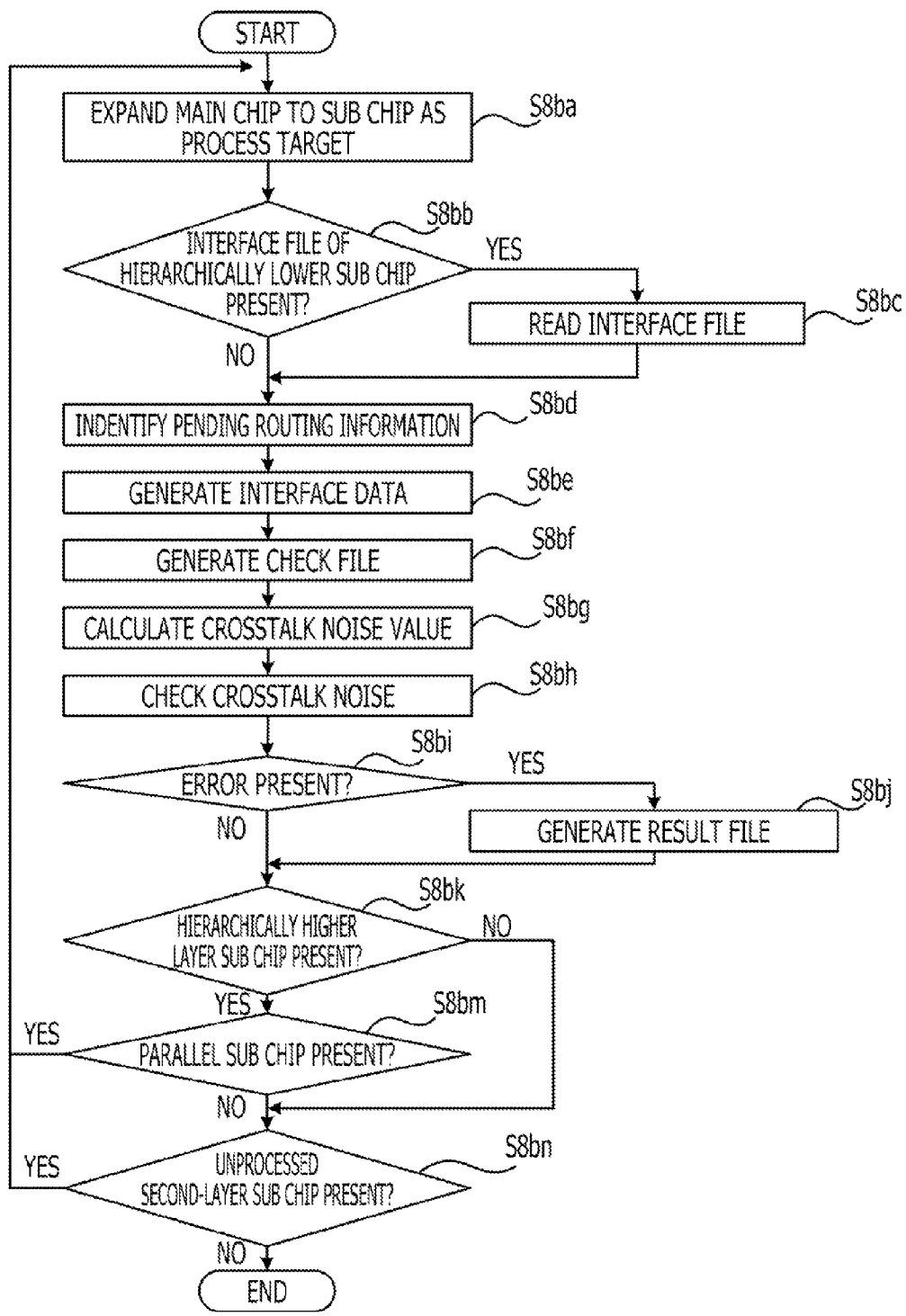
FIG. 9 is a flowchart illustrating a process of a sub-chip processor.

FIG. 9 is a flowchart of the process of the sub-chip processor 12.

S8ba The database selector 121 selects, from the main-chip DB and the sub-chip DB, data of the check-target sub chip, the sub chip at an upper layer above the check-target sub chip, and the main chip. The layout data reading unit 122 expands the sub chips and the main chip selected by the database selector 121. All the sub chips and the main chip as a process target with respect to the check-target sub chip are expanded.

S8bb The interface file reading unit 123 determines whether an interface file of a hierarchically lower sub chip is present on the interface file storage unit 23. If such an interface file is present (yes from S8bb), processing proceeds to S8bc. If such an interface file is not present (no from S8bb), processing proceeds to S8bd.

S8bc The interface file reading unit 123 reads the interface file stored on the interface file storage unit 23.

S8bd The check data generator 124 identifies the pending routing information. If the interface file is read in S8bc, the read interface file is accounted for when the pending routing information is identified.

S8be The check data generator 124 generates the check data in accordance with the pending routing information identified in S8bd.

S8bf The interface file generator 125 generates the interface file including the pending routing information extracted by the check data generator 124. The interface file generator 125 stores the generated interface file on the interface file storage unit 23.

S8bg The crosstalk noise value calculator 126 calculates the crosstalk noise value of the check target in accordance with the check data generated in S8bf.

S8bh The crosstalk noise value determiner 127 performs the crosstalk noise check on the check-target sub chip with respect to all nets and wire lines on the check-target sub chip.

S8bi The check results in S8bh indicate whether the routing error information is present. If the routing error information is present (yes from S8bi), processing proceeds to S8bj. If no routing error information is present (no from S8bi), processing proceeds to S8bk.

S8bj The result file generator 128 writes the routing error information in the result file, and stores the result file on the result file storage unit 24.

S8bk The sub-chip processor 12 determines whether a sub chip is present at a layer hierarchically higher than the sub chip as the current process target, i.e., whether the sub chip as the current process target is a sub chip at the second layer. If a sub chip is present at a layer hierarchically higher than the sub chip as the current process target (yes from S8bk), processing proceeds to S8bm. If a sub chip is not present at a layer hierarchically higher than the sub chip as the current process target (no from S8bk), processing proceeds to S8bn.

S8bm The sub-chip processor 12 determines whether there is an unprocessed sub chip being present at the same layer as the layer of the sub chip as the current process target and having a sub chip at the layer higher than the sub chip as the current process target by one layer. If there is a sub chip satisfying the above condition (yes from S8bm), processing proceeds to S8ba. S8ba and subsequent operations are performed on the sub chip satisfying the above condition. If there is no sub chip satisfying the above condition (no from S8bm), processing proceeds to S8bn.

S8bn The sub-chip processor 12 determines whether an unprocessed sub chip at the second layer is present. If an unprocessed sub chip at the second layer is present (yes from S8bn), processing proceeds to S8ba. The sub-chip processor 12 selects a sub chip at the bottommost layer below the unprocessed sub chip at the second layer, and performs S8ba and subsequent operations on the selected sub chip. If an unprocessed sub chip at the second layer is not present (no from S8bn), the process of FIG. 9 ends.

In the process of FIG. 9, the expansion process is performed with respect to the check-target sub chip.

The number of sub chips to be concurrently processed is substantially reduced, and all the sub chips used for the crosstalk noise check with respect to each sub chip is taken into account. The sub chips are processed in parallel.

The designer may learn the correct check results of noise at an earlier phase of the layout design.

A specific process of the design assisting apparatus 10 is discussed.

The specific process discussed here is performed on the LSI 30 having the four layers illustrated in FIG. 5.

Figure 10:
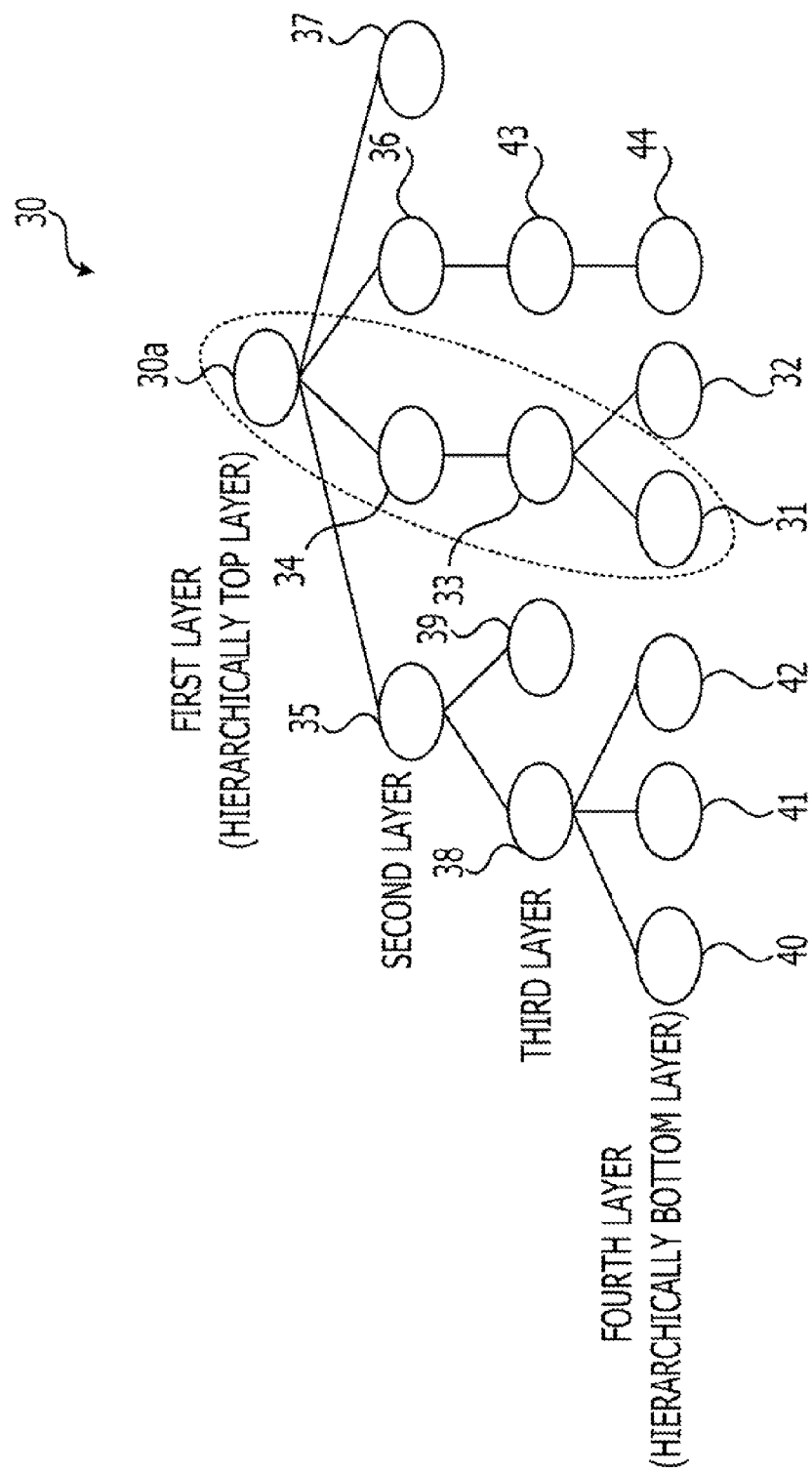
FIG. 10 illustrates layers of an LSI.

FIG. 10 illustrates the layers of the LSI 30.

As illustrated in FIG. 10, the LSI 30 has a hierarchical tree structure. FIG. 10 also illustrates sub chips at each layer denoted as black boxes in FIG. 5. In FIG. 5, the sub chip 35 denoted as the black box has sub chips 38 and 39 at the third layer thereunder. The sub chip 38 has sub chips 40, 41, and 42 at the fourth layer thereunder.

The sub-chip processor 12 performs the process of FIG. 9. More specifically, the sub-chip processor 12 expands a portion enclosed by a broken line illustrated in FIG. 10, i.e., the sub chip 31 at the fourth layer as the bottommost layer, the sub chip 33 at the third layer above the sub chip 31, the sub chip 34 at the second layer, and the main chip 30a at the first layer as the topmost layer.

Figure 11:
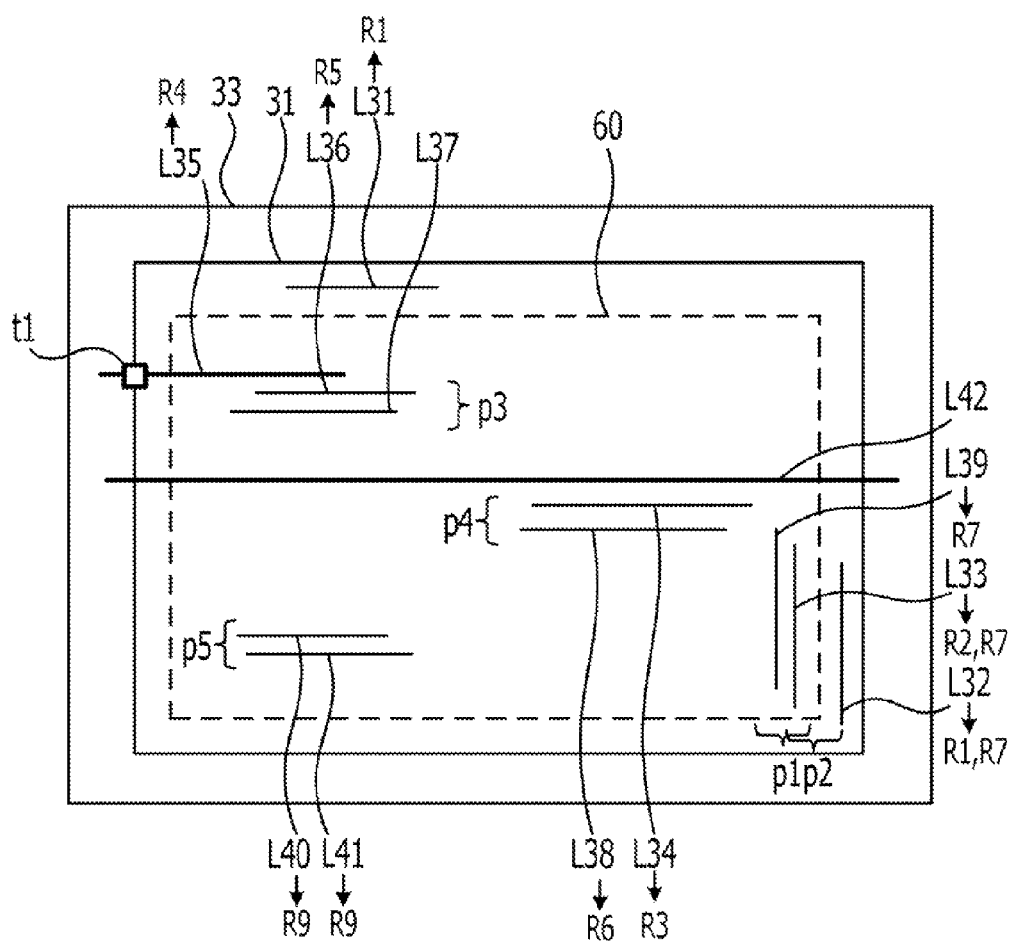
FIG. 11 illustrates information written in an interface file, and routing error information written in a result file.

FIG. 11 illustrates information written in the interface file and the routing error information written in the result file. Wire lines L31-L42 are illustrated in FIG. 11.

A region delineated by a boundary line 60 spaced from the outline of the sub chip 31 by a specific distance is set in the sub chip 31. The boundary line 60 denotes a criterion according to which any line as an aggressor net affects a net on another sub chip (or the main chip 30a). The distance may be determined by taking into account factors such as applicable technology requirements and spacing in circuit model simulation. The sub-chip processor 12 regards a noise generated from a line within the area enclosed by the boundary line 60 as not affecting another chip. A boundary line having substantially the same effect as the boundary line 60 is set in the other sub chips 32-44.

The check data generator 124 identifies the pending routing information. More specifically, the check data generator 124 searches for a line present outside the boundary line 60 within the sub chip 31 in accordance with the rule 1. The wire lines L31 and L32 are found in the search. The check data generator 124 identifies the wire lines L31 and L32 as the pending routing information of the sub chip 31.

According to the rule 2, the interface file generator 125 searches for all wire lines as the aggressor net serving as an error line to the wire lines identified according to the rule 1, i.e., all wire lines as the aggressor net as an error line to the wire lines L31 and L32. The interface file generator 125 finds the wire line L33. The interface file generator 125 identifies the wire line L33 as the pending routing information of the sub chip 31.

According to the rule 3, the check data generator 124 searches for all wire lines on the upper layers and all the wire lines as an aggressor net serving as an error line. The check data generator 124 finds, with respect to the sub chip 31, the wire line L42 on the sub chip 33 belonging to the upper layer, and the wire line L34 as an aggressor net serving as an error line. The check data generator 124 identifies the wire line L34 as the pending routing information of the sub chip 31.

According to the rule 4, the check data generator 124 searches for all wire lines of the nets connected to a terminal. The check data generator 124 finds on the sub chip 31 the wire line L35 connected to a terminal t1 of the sub chip 31. The check data generator 124 identifies the wire line L35 as the pending routing information of the sub chip 31.

According to the rule 5, the check data generator 124 searches for all wire lines as the aggressor net serving as an error line to the wire lines identified according to the rule 4, i.e., all wire lines as the aggressor net serving an error line to the wire line L35. The check data generator 124 finds the wire line L36 on the sub chip 31. The check data generator 124 identifies the wire line L36 as the pending routing information of the sub chip 31.

According to the rule 6, the check data generator 124 searches for all wire lines of the aggressor net serving as an error line to the wire lines identified according to the rule 3 and the rule 5 and specified as the victim net, i.e., all wire lines of the aggressor net serving an error line to the wire lines L34 and L36 specified as the victim net. The check data generator 124 finds the wire line L38 to the wire line L34 on the sub chip 31. The check data generator 124 also finds the wire line L37 to the wire line L36 on the sub chip 31.

The check data generator 124 identifies the wire lines L37 and L38 as the pending routing information of the sub chip 31.

The check data generator 124 generates the check data. More specifically, according to the pattern 1, the check data generator 124 searches for the aggressor net that completes the crosstalk noise calculation within the area of the sub chip 31 with the wire line L33 specified to be a victim net. As a result, the wire lines L32 and L39 are found. The check data generator 124 then sets as a check target a line pair P2 with the wire line L32 specified to be an aggressor net and the wire line L33 specified to be a victim net. The check data generator 124 sets as a check target a line pair P1 with the wire line L33 specified to be a victim net and the wire line L39 specified to be an aggressor net.

According to the pattern 2, the check data generator 124 searches for the aggressor net that completes the crosstalk noise calculation within the area of the sub chip 31 with the wire lines L37 and L38 respectively specified to be a victim net. As a result, the wire line L36 is found with respect to the wire line L37. The wire line L34 is found with respect to the wire line L38. The check data generator 124 sets as a crosstalk noise check target a line pair P3 with the wire line L37 specified to be a victim net and the wire line L36 specified to be an aggressor net. The check data generator 124 sets as a crosstalk noise check target a line pair P4 with the wire line L38 specified to be a victim net and the wire line L34 specified to be an aggressor net.

According to the pattern 3, the check data generator 124 searches for a pair of wire lines that complete the crosstalk noise calculation within the sub chip 31 and mutually serve as an error line within the sub chip 31. Through the search, the wire lines L40 and L41 are found. The check data generator 124 sets a crosstalk noise check target a pair p5 of the wire lines L40 and L41.

The interface file generator 125 generates the interface file including the pending routing information identified by the check data generator 124. The interface file generator 125 stores the generated interface file on the interface file storage unit 23 as an interface file of the sub chip 31.

The crosstalk noise value calculator 126 calculates the crosstalk noise values of the line pairs p1-p5 included in the check data generated by the check data generator 124.

In accordance with the limitation value prepared beforehand, the crosstalk noise value determiner 127 determines whether the crosstalk noise value calculated by the crosstalk noise value calculator 126 is equal to or lower than the limitation value. The crosstalk noise value calculator 126 specifies as an error line a line pair having a crosstalk noise value higher than the limitation value.

The result file generator 128 writes the routing error information in the result file and stores the result file on the result file storage unit 24.

The generation of the interface file and the result file of the sub chip 31 is now complete. The sub-chip processor 12 determines whether the sub chip 31 as the current process target is a sub chip at the second layer. Since the sub chip 31 is not a sub chip at the second layer, the sub-chip processor 12 recognizes that the sub chip 33 at a layer higher than the sub chip 31 as the current process target by one layer is a sub chip at the upper layer. The sub-chip processor 12 then determines whether an unprocessed sub chip is present at the fourth layer, i.e., at the same layer as the layer of the sub chip 31. The sub chip 32 is thus found.

The sub-chip processor 12 generates the interface file and the result file of the sub chip 32.

Figure 12:
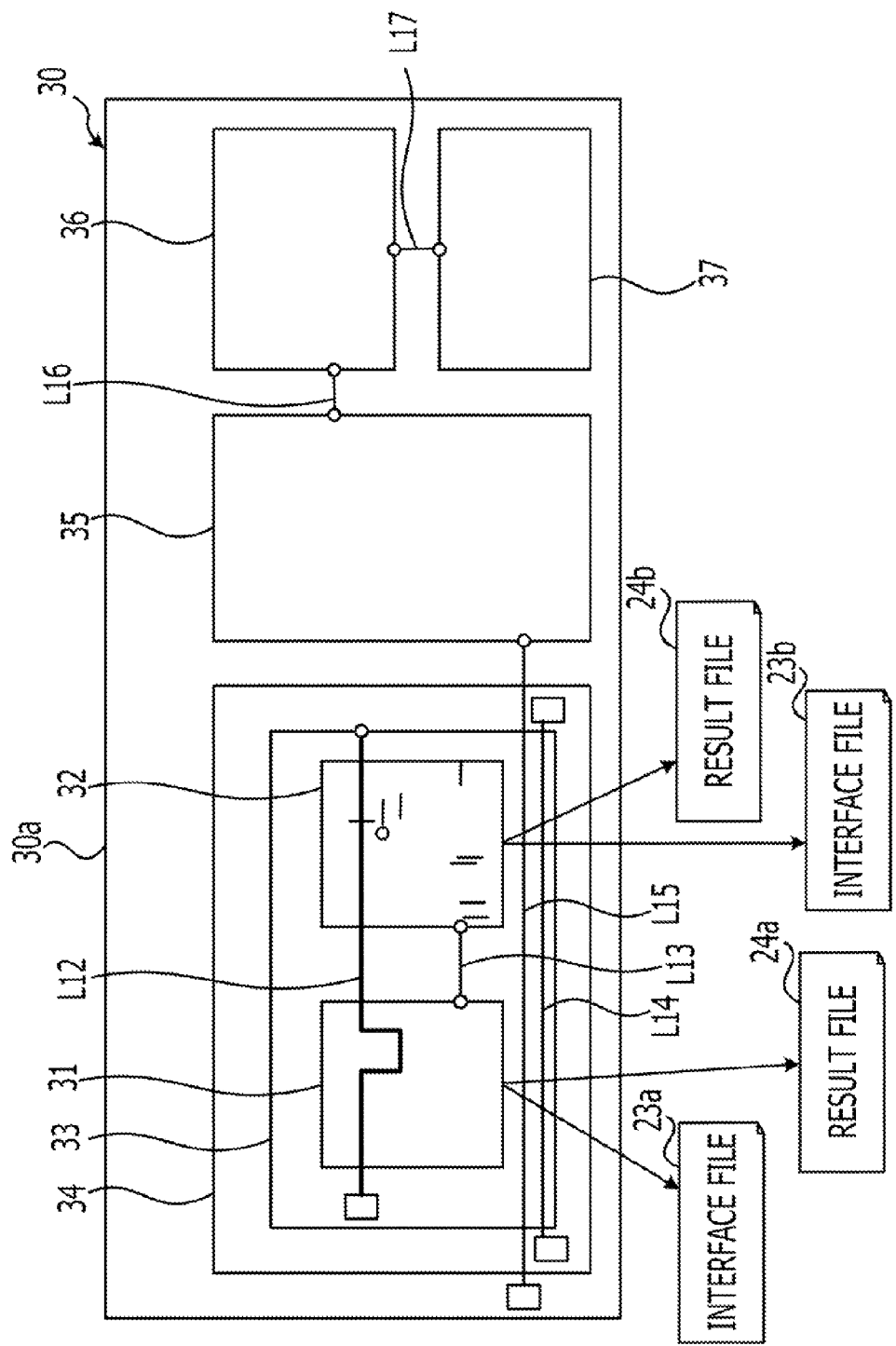
FIG. 12 illustrates a process of the sub-chip processor generating the interface file and the result file.

FIG. 12 illustrates a generation process of the sub-chip processor 12 generating the interface file and the result file.

With reference to FIG. 12, the check results of the crosstalk noise check of the sub chip 31 are written in an interface file 23a and a result file 24a. The check results of the crosstalk noise check of the sub chip 32 are written in an interface file 23b and a result file 24b.

With the crosstalk noise check completed on the sub chip 32, the sub-chip processor 12 determines whether the sub chip 32 as the current process target is a sub chip at the second layer. Since the sub chip 32 is not a sub chip at the second layer, the sub-chip processor 12 recognizes that the sub chip 33 at a layer higher than the sub chip 32 as the current process target by one layer is a sub chip at the upper layer. The sub-chip processor 12 then determines whether an unprocessed sub chip is present at the fourth layer, i.e., at the same layer as the layer of the sub chip 32. No such sub chip is found. The sub-chip processor 12 determines whether a sub chip higher than the sub chips 31 and 32 is present. Since the sub chip 33 above the sub chip 31 and the sub chip 32 is found, the sub-chip processor 12 generates an interface file and a result file of the sub chip 33.

Figure 13:
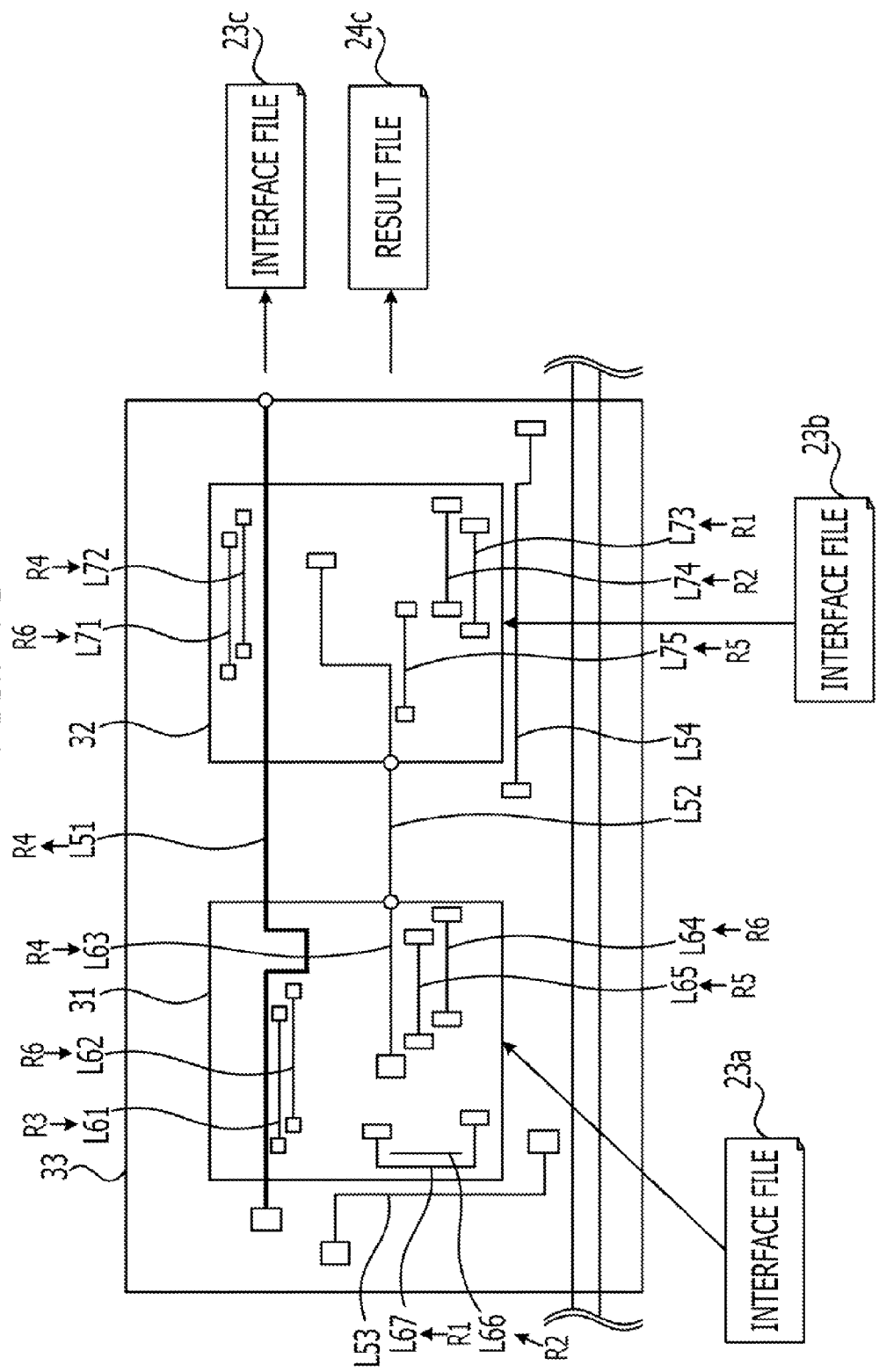
FIG. 13 illustrates a generation of the interface file and the result file.

FIG. 13 illustrates a generation process of the interface file and the result file. As illustrated in FIG. 13, each line is labeled a rule number according to which the line is written in the interface file 23a. For convenience of explanation, the routing of the sub chip 31 illustrated in FIG. 13 is different from the routing of the sub chip 31 illustrated in FIG. 11.

The interface file reading unit 123 reads the interface file 23a. The check data generator 124 extracts the pending routing information of the sub chip 31 from the interface file 23a. The check data generator 124 also extracts the pending routing information of the sub chip 32 from the interface file 23b.

The check data generator 124 applies the rule 1 through the rule 6 to the sub chip 33, thereby identifying the line complying with each of the rules in accordance with the pending routing information. The wire lines belonging to the sub chip 33 are four wire lines L51, L52, L53, and L54. Since the rule 4 is applied to the wire line L51, the wire line L51 is included the pending routing information. The check data generator 124 recognizes that the wire lines L52-L54 are those within the sub chip 33.

The check data generator 124 generates the check data.

Information of the wire lines L52 and L53 is clarified with reference to FIG. 13. Out of the wire lines L61-L67 identified by the pending routing information written in the interface file 23a, the crosstalk noise values of the wire lines L64, L65, and L67 may be calculated. The check data generator 124 thus generates the check data that set the wire lines L64, L65, and L67 as the crosstalk noise check target.

Information of the wire lines L52 and L54 is now clarified. Out of the wire lines L71-L75 identified by the pending routing information written in the interface file 23b, the crosstalk noise values of the wire lines L73, and L75 may be calculated. The check data generator 124 thus generates the check data that set the wire lines L73 and L75 as the crosstalk noise check target.

The interface file generator 125 generates an interface file 23c including the pending routing information identified by the check data generator 124. The interface file generator 125 stores the generated interface file 23c on the interface file storage unit 23.

The crosstalk noise value calculator 126 calculates the crosstalk noise value of each line pair in accordance with the check data. The crosstalk noise value determiner 127 specifies as an error line a line pair having the calculated crosstalk noise value higher than a constant value.

The result file generator 128 writes the routing error information in a result file 24c and stores the result file 24c on the result file storage unit 24 as a result file of the sub chip 33.

With the crosstalk noise check completed on the sub chip 33, the sub-chip processor 12 determines whether the sub chip 33 as the current process target is a sub chip at the second layer. Since the sub chip 33 is not a sub chip at the second layer, the sub-chip processor 12 recognizes that the sub chip 34 at a layer higher than the sub chip 33 as the current process target by one layer is a sub chip at the upper layer. The sub-chip processor 12 determines whether an unprocessed sub chip is present at the third layer, i.e., at the same layer as the layer of the sub chip 32. No such sub chip is found. The sub-chip processor 12 determines whether a sub chip higher than the sub chip 33 is present. Since the sub chip 34 above the sub chip 33 is found, the sub-chip processor 12 generates an interface file and a result file of the sub chip 34.

More specifically, the sub-chip processor 12 performs the crosstalk noise check on the sub chip 34 using the interface file 23c. The check results are written in an interface file 23d and a result file 24d.

Figure 14:
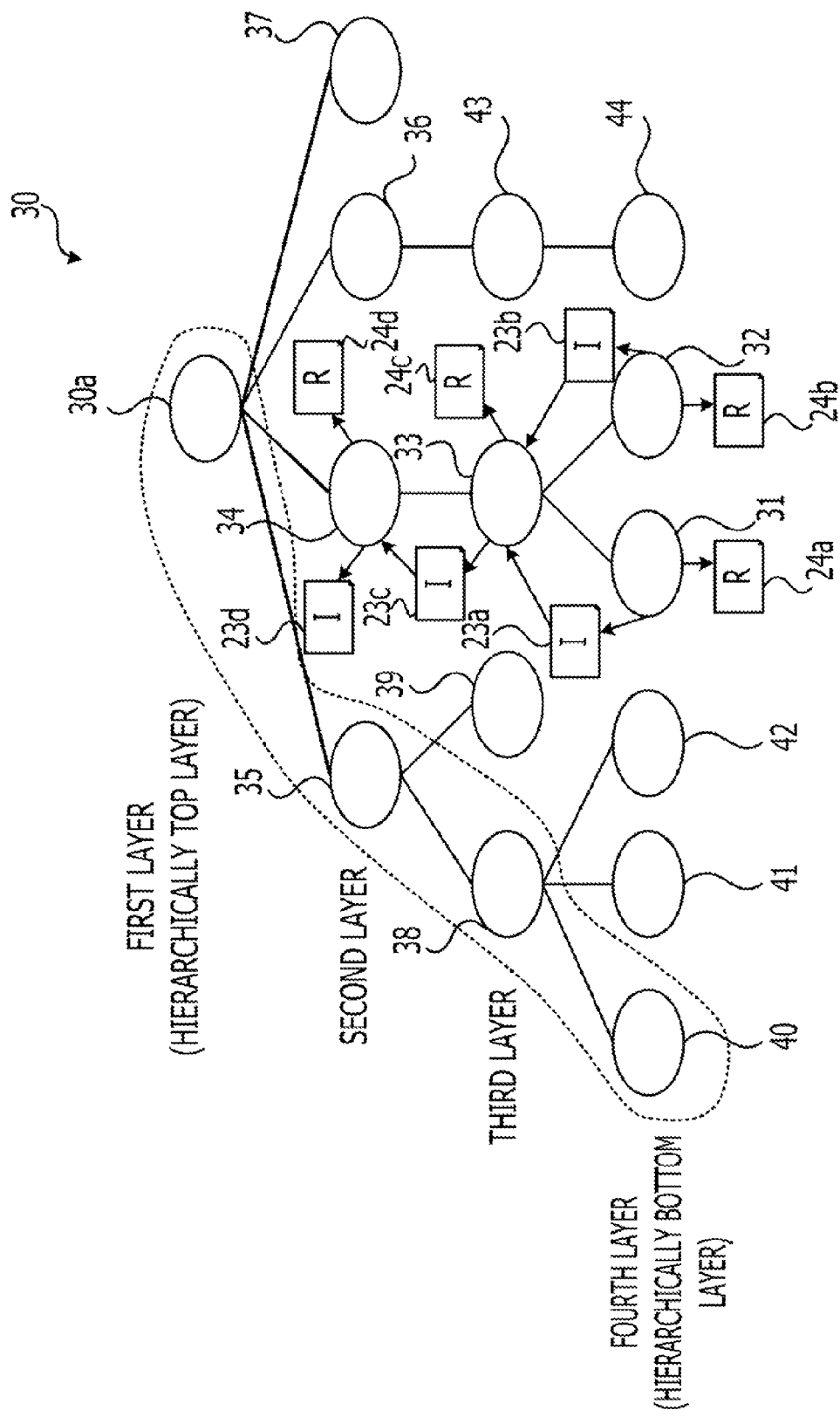
FIG. 14 illustrates the layers of the LSI.

FIG. 14 illustrates the layers of the LSI.

With the crosstalk noise check completed on the sub chip 34, the sub-chip processor 12 determines whether the sub chip 34 as the current process target is a sub chip at the second layer. Since the sub chip 34 is a sub chip at the second layer, the sub-chip processor 12 determines whether an unprocessed sub chip is present at the second layer. The sub chip 35 is found as an processed sub chip at the second layer. The sub-chip processor 12 expands sub chip 40 at the fourth layer, sub chip 38 at the third layer, sub chip 35 at the second layer, and main chip 30a.

The process described above is performed on the expanded sub chips. The expanded sub chips are processed, and substantially the same process is also performed on an unprocessed sub chip at the second layer.

If the generation of the interface file and the result file for all the sub chips 31-44 is complete, the design assisting apparatus 10 performs the crosstalk noise check on the main chip 30a.

Figure 15:
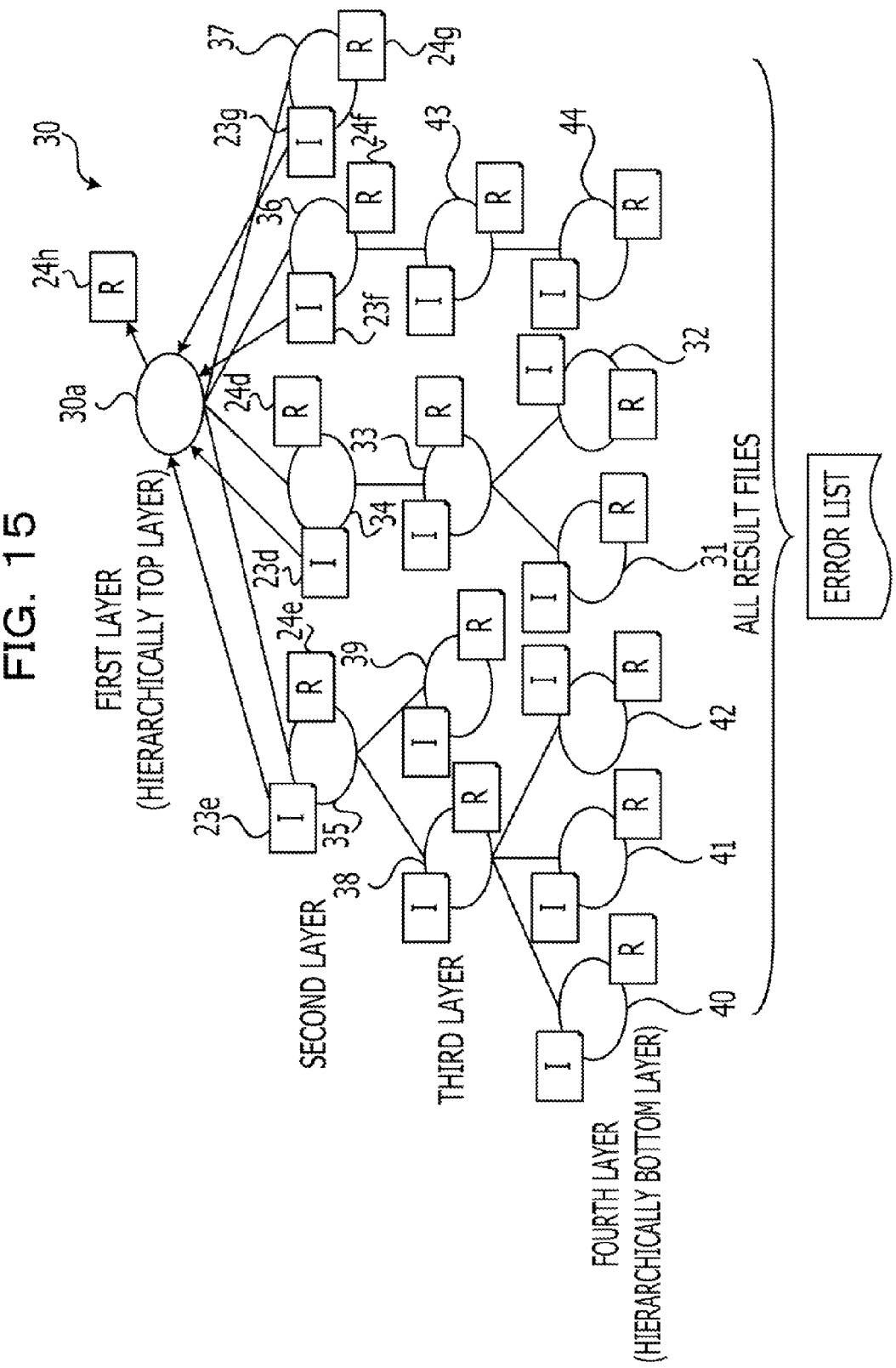
FIG. 15 illustrates a crosstalk noise check of a main chip.

FIG. 15 illustrates the crosstalk noise check performed on the main chip 30a. As illustrated in FIG. 15, arrow-headed lines pointing to the interface file and the result file are partially omitted.

In the crosstalk noise check of the main chip 30a, the interface file reading unit 14 reads the interface files 23d, 23e, 23f, and 23g generated during the crosstalk noise checks of the sub chips 34, 35, 36, and 37 at the second layer.

The crosstalk noise value calculator 16 calculates the crosstalk noise value in accordance with the read interface files and the check data generated by the check data generator 15. The connection of all the wire lines is learned during the crosstalk noise calculation of the main chip 30a. The crosstalk noise value determiner 17 may determine the wire lines of the nets stored in the interface files 23d, 23e, 23f, and 23g. The result file generator 18 stores on the result file storage unit 24 a result file 24h having the routing error information written therein.

The all result file reading unit 19 reads all the result files stored on the result file storage unit 24. The error list generator 20 summarizes all the read result files into an error list, and outputs the error list.

The process of the design assisting apparatus 10 is thus complete.

The design assisting apparatus 10 thus expands the topmost layer block down to the bottommost layer block as a target, and performs the process thereof. In comparison with the case that all the layers are expanded, the size of data handled is small. The crosstalk noise check is performed quickly.

The crosstalk noise check is made each time a wire line becomes eligible for the crosstalk noise value calculation. An error, if created, is written on the result file. An amount of data to be stored on the memory remains small.

A wire line may be connected to a terminal, or a wire line in a boundary region may be eligible for the crosstalk noise check after a relation with a wire line on a sub chip at an upper layer is clarified. These wire line may be written in the interface file, and the crosstalk noise value is calculated after the wire lines become eligible for the crosstalk noise check. The process of the design assisting apparatus 10 is thus efficient free from any unnecessary operation.

The process of each layer is ready to be executed as long as the process of a hierarchically lower layer has been complete. The processes of the layers may run in parallel, and high-speed processing is achieved.

At a layer, data may not be ready because of a design delay (with the layout thereof being incomplete). In such a case, the crosstalk noise check may be performed on a selected layer with the unready layer treated as a black box.

According to the embodiment, the design assisting apparatus 10 includes the main-chip DB storage unit 21 and the sub-chip DB storage unit 22. Alternatively, the main-chip DB storage unit 21 and/or the sub-chip DB storage unit 22 may be included in a server external to the design assisting apparatus 10.

The process of the design assisting apparatus 10 may be performed by a plurality of apparatuses in a distributed processing. For example, one apparatus may perform the logic synthesis to generate a test pattern, and another apparatus may perform the crosstalk noise check using the test pattern. In another arrangement, one apparatus may generate the interface file and the result file of each sub chip, and another apparatus may perform the crosstalk noise check on a whole circuit as a design target using the interface file and the result file.

The design assisting apparatus, the design assisting method, and the design assisting program have been discussed with reference to the illustrated embodiments. The invention is not limited to these embodiments. Each element of the embodiments may be replaced with any element having an equivalent function. Any element or an operation may be added to the structure of the embodiment.

A combination of any two or more elements (features) of each of the embodiments may fall within the scope of the invention.

The process of the design assisting apparatus 10 may be executed by a computer. In such a case, a program describing the content of the process of each of the design assisting apparatuses 1 and 10 is provided. The computer executing the program performs the process. The program describing the content of the process may be recorded on a computer readable recording medium. The computer readable recording media include magnetic storage device, optical disc, magneto-optical recording medium, and semiconductor memory. The magnetic storage devices include hard disc device (HDD), flexible disc (FD), and magnetic tape. The optical discs include DVD, DVD-RAM, and CD-ROM/RW. The magneto-optical recording media include a magneto-optical disc (MO).

To circulate the program, a portable recording medium such as a DVD or a CD-ROM, recording the program, is commercially available. The program may be stored on a storage device of a server computer, and may then be transmitted from the server computer to another computer.

The computer executing the program stores the program, recorded on the portable recording medium, or transmitted from the server computer, onto a storage device thereof. The computer reads the program from the storage device thereof, and performs the process in accordance with the program. The computer may read the program directly from the portable recording medium, and performs the program in accordance with the program. The computer may successively perform the process in accordance with the program each time the program is transmitted from the server computer connected via a network.

Part or the whole of the process of the design assisting apparatus may be implemented using an electronic circuit such as a digital signal processor (DSP), an application specific integrated circuit (ASIC), or a programmable logic device (PLD).

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiment(s) of the present invention has(have) been described in detail, it should be understood that the various changes, substitutions, and alterations could be made hereto without departing from the spirit and scope of the invention.

What is claimed is:

1. A design assisting apparatus comprising:
a memory configured to store routing information representing a first wire line from wire lines of a module belonging to a first layer of a semiconductor circuit having a plurality of layers, the module having a first layout area, the first wire line being likely to become either one of an aggressor net and a victim net in a crosstalk noise check performed on wire lines of a supra-chip, the supra-chip being a module belonging to a second layer hierarchically higher than the first layer, the first layout area being within a second layout area of the supra-chip; and
a processor configured to
perform a wire line identification for a first module, the wire line identification for the first module identifying a second wire line within the supra-chip of the first module, the second wire line being likely to become either one of an aggressor net and a victim net in the crosstalk noise check performed on the first wire line represented by the routing information stored on the memory, the second wire line being an aggressor net when the first wire line is a victim net and a victim net when the first wire line is an aggressor net, the processor performing the wire line identification for the first module separately and in parallel with the wire line identification for a second module, the second module not being a supra-chip of the first module, the first module not being a supra-chip of the second module;

determine whether an interface file belonging to a layer lower than a sub chip as a check target is present; and read the interface file of sub chips of all lower layers when a determination is made that the interface file is present.

2. The design assisting apparatus according to claim 1, wherein the processor, when identifying the second wire line of the supra-chip, identifies a wire line likely to become either one of the aggressor net and the victim net to each of the wire lines represented by the routing information of the first module.

3. The design assisting apparatus according to claim 1, wherein the processor repeats the wire line identification to identify the second wire line of the supra-chip.

4. The design assisting apparatus according to claim 1, wherein the processor verifies a crosstalk noise between the identified wire line and the first wire line represented by the routing information.

5. The design assisting apparatus according to claim 4, wherein the processor accumulates verification results indicating a wire line combination giving a crosstalk noise value equal to or higher than a specific value from among the verification results of the verified module of the layer.

6. The design assisting apparatus according to claim 4, wherein the processor omits the calculation of a crosstalk noise value at a location where the supra-chip is partially specified as a black box.

7. A design assisting method comprising:

referencing, by a processor, routing information representing a first wire line from wire lines of a module belonging to a first layer of a semiconductor circuit having a plurality of layers, the module having a first layout area, the first wire line being likely to become either one of an aggressor net and a victim net in a crosstalk noise check performed on wire lines of a supra-chip, the supra-chip being a module belonging to a second layer hierarchically higher than the first layer, the first layout area being within a second layout area of the supra-chip;

identifying a second wire line within the supra-chip of the first module, the second wire line being likely to become either one of an aggressor net and a victim net in the crosstalk noise check performed on the first wire line represented by the routing information stored on the memory, the second wire line being an aggressor net when the first wire line is a victim net and a victim net when the first wire line is an aggressor net, the processor performing the wire line identification for the first module separately and in parallel with the wire line identification for a second module, the second module not being a supra-chip of the first module, the first module not being a supra-chip of the second module;

determining whether an interface file belonging to a layer lower than a sub chip as a check target is present;

reading the interface file of sub chips of all lower layers when a determination is made that the interface file is present; and outputting information of the identified wire line.

8. A computer-readable, non-transitory storage medium storing therein a design assisting program that causes a computer to execute a process, the process comprising:

referencing, by a processor, routing information representing a first wire line from wire lines of a module belonging to a first layer of a semiconductor circuit having a plurality of layers, the module having a first layout area, the first wire line being likely to become either one of an aggressor net and a victim net in a crosstalk noise check performed on wire lines of a supra-chip, the supra-chip being a module belonging to a second layer hierarchically higher than the first layer, the first layout area being within a second layout area of the supra-chip;

identifying a second wire line within the supra-chip of the first module, the second wire line being likely to become either one of an aggressor net and a victim net in the crosstalk noise check performed on the first wire line represented by the routing information stored on the memory, the second wire line being an aggressor net when the first wire line is a victim net and a victim net when the first wire line is an aggressor net, the processor performing the wire line identification for the first module separately and in parallel with the wire line identification for a second module, the second module not being a supra-chip of the first module, the first module not being a supra-chip of the second module;

determining whether an interface file belonging to a layer lower than a sub chip as a check target is present; and reading the interface file of sub chips of all lower layers when a determination is made that the interface file is present; and outputting information of the identified wire line.

* * * * *